US009727628B2

(12) United States Patent
Stading et al.

(10) Patent No.: US 9,727,628 B2
(45) Date of Patent: Aug. 8, 2017

(54) SYSTEM AND METHOD OF APPLYING GLOBALLY UNIQUE IDENTIFIERS TO RELATE DISTRIBUTED DATA SOURCES

(75) Inventors: Tyron Jerrod Stading, Austin, TX (US); Ryan Rozich, Austin, TX (US); Roji John, Austin, TX (US)

(73) Assignee: Innography, Inc., Austin, TX (US)

( * ) Notice: Subject to any disclaimer, the term of this patent is extended or adjusted under 35 U.S.C. 154(b) by 561 days.

(21) Appl. No.: 12/189,311

(22) Filed: Aug. 11, 2008

(65) Prior Publication Data

US 2010/0037161 A1    Feb. 11, 2010

(51) Int. Cl.
*G06F 17/30*     (2006.01)

(52) U.S. Cl.
CPC .... *G06F 17/30592* (2013.01); *G06F 17/3043* (2013.01); *G06F 17/30557* (2013.01)

(58) Field of Classification Search
CPC ............. G06F 17/30592; G06F 17/30557
USPC ................... 707/E17.096, E17.112, 700
See application file for complete search history.

(56) References Cited

U.S. PATENT DOCUMENTS

| | | | |
|---|---|---|---|
| 5,644,740 A * | 7/1997 | Kiuchi | G06F 17/30643 |
| | | | 707/E17.067 |
| 6,728,697 B2 | 4/2004 | Leathers | |
| 6,741,743 B2 | 5/2004 | Stalcup et al. | |
| 6,934,710 B1 * | 8/2005 | Mills | G06F 17/30575 |
| 7,171,427 B2 | 1/2007 | Witkowski et al. | |
| 7,251,665 B1 | 7/2007 | Dunning et al. | |
| 7,269,823 B2 * | 9/2007 | Szyperski | G06F 9/4428 |
| | | | 717/114 |
| 7,302,423 B2 * | 11/2007 | De Bellis | G06F 17/30392 |
| | | | 345/663 |
| 7,333,982 B2 | 2/2008 | Bakalash et al. | |
| 7,349,897 B2 | 3/2008 | Cunningham et al. | |
| 7,356,541 B1 | 4/2008 | Doughty | |
| 7,392,248 B2 | 6/2008 | Bakalash et al. | |
| 7,555,447 B2 * | 6/2009 | Chinnappan | G06F 17/30873 |
| | | | 705/16 |

(Continued)

OTHER PUBLICATIONS

Leach, Paul J., et al., "UUIDS and GUIDS," Internet Draft, Internet Engineering Task Force, Feb. 4, 1998, pp. 1-28.

(Continued)

*Primary Examiner* — Sheree Brown
(74) *Attorney, Agent, or Firm* — Cesari & Reed, LLP; R. Michael Reed

(57) ABSTRACT

In a particular embodiment, a method includes sending a text string from a source device to a destination device. The destination device includes a unique identifier repository having a plurality of globally unique identifiers mapped text strings, relationship data defining associations between the plurality of globally unique identifiers, and meta-data related to the text string. Each of the plurality of globally unique identifiers includes a data value that is shared by a plurality of data sources as an identifier associated with information related to the text string. The method further includes receiving data including one or more globally unique identifiers, associated relationship data, and associated meta-data from the destination device at the source device in response to sending the text string. Additionally, the method includes storing the received data at a memory of the source device for use in searching and relating search results received from multiple data sources.

7 Claims, 16 Drawing Sheets

(56) References Cited

U.S. PATENT DOCUMENTS

| | | | |
|---|---|---|---|
| 7,630,986 B1* | 12/2009 | Herz et al. | |
| 7,783,596 B2* | 8/2010 | Smolen et al. | 707/609 |
| 7,788,125 B2* | 8/2010 | Greenfield | G06Q 10/087 705/28 |
| 7,925,444 B2* | 4/2011 | Garrity et al. | 702/19 |
| 8,583,592 B2* | 11/2013 | Stading | G06F 17/30867 707/602 |
| 2002/0073075 A1 | 6/2002 | Dutta et al. | |
| 2002/0091707 A1 | 7/2002 | Keller | |
| 2002/0103705 A1* | 8/2002 | Brady | 705/14 |
| 2002/0126545 A1 | 9/2002 | Warren et al. | |
| 2003/0046307 A1* | 3/2003 | Rivette | G06F 17/30011 |
| 2003/0046365 A1* | 3/2003 | Pfister et al. | 709/219 |
| 2003/0110272 A1* | 6/2003 | du Castel | G06F 17/30902 709/229 |
| 2003/0125898 A1* | 7/2003 | Stark | 702/123 |
| 2003/0167253 A1* | 9/2003 | Meinig | G06F 17/30303 |
| 2003/0191766 A1* | 10/2003 | Elin | 707/100 |
| 2004/0034616 A1 | 2/2004 | Witkowski et al. | |
| 2005/0102271 A1 | 5/2005 | Robertson | |
| 2005/0103871 A1* | 5/2005 | Dresevic et al. | 235/487 |
| 2005/0149538 A1* | 7/2005 | Singh | G06F 17/30893 |
| 2005/0289158 A1* | 12/2005 | Weiss et al. | 707/100 |
| 2006/0106859 A1* | 5/2006 | Eugene et al. | 707/102 |
| 2006/0117377 A1* | 6/2006 | Frenkiel et al. | 726/2 |
| 2006/0149767 A1* | 7/2006 | Kindsvogel et al. | 707/101 |
| 2006/0200480 A1 | 9/2006 | Harris et al. | |
| 2006/0248045 A1 | 11/2006 | Toledano et al. | |
| 2007/0019648 A1 | 1/2007 | Robinson et al. | |
| 2007/0078832 A1 | 4/2007 | Ott, IV et al. | |
| 2007/0162350 A1 | 7/2007 | Friedman | |
| 2007/0192855 A1* | 8/2007 | Hulten | G06F 17/30887 726/22 |
| 2007/0220027 A1* | 9/2007 | Richey | G06Q 10/06 |
| 2007/0239697 A1* | 10/2007 | Chen | G06F 17/30616 |
| 2007/0260620 A1* | 11/2007 | Smolen et al. | 707/100 |
| 2007/0260621 A1* | 11/2007 | Smolen et al. | 707/100 |
| 2007/0276928 A1* | 11/2007 | Rhoads et al. | 709/219 |
| 2008/0005086 A1* | 1/2008 | Moore | G06F 17/30876 |
| 2008/0005194 A1* | 1/2008 | Smolen et al. | 707/202 |
| 2008/0010319 A1* | 1/2008 | Vonarburg et al. | 707/104.1 |
| 2008/0148339 A1* | 6/2008 | Hill et al. | 726/1 |
| 2008/0172360 A1* | 7/2008 | Lim | G06F 17/30448 |
| 2008/0244429 A1* | 10/2008 | Stading | G06F 17/30554 715/764 |
| 2008/0288516 A1* | 11/2008 | Hadfield | G06F 17/30666 |

OTHER PUBLICATIONS

Forsman, Sarah, "OLAP Council White Paper," OLAP Council, 1997, pp. 1-5.

"VERITAS Storage Foundation TM 4.0, Release Notes, Linux," VERITAS Software Corporation, Aug. 2004, pp. 1-64.

"VERITAS Volume Manager 4.1 Release Notes: HP-UX 11i v2, Eighth Edition" Manufacturing Part No. 5991-5288, Hewlett-Packard Development Company L.P., Jun. 2007, pp. 1-43.

"ITU-T X.667 Series X: Data Networks and Open System Communications: OSI Networking and System Aspects—Naming, Addressing and Registration," Telecommunication Standardization Sector of the International Telecommunication Union, Sep. 2004, pp. 1-34.

"ITU-T X.662 Series X: Data Networks and Open System Communications: OSI Networking and System Aspects—Naming, Addressing and Registration," Telecommunication Standardization Sector of the International Telecommunication Union, Aug. 2004, pp. 1-14.

"ITU-T X.660 Series X: Data Networks and Open System Communications: OSI Networking and System Aspects—Naming, Addressing and Registration," Telecommunication Standardization Sector of the International Telecommunication Union, Aug. 2004, pp. 1-30.

* cited by examiner

500 ⟶

```
<XML>
    <item @id=ABC>                    ⟵ 502
        <product>WebSphere</product>
        <company>IBM</company>
        <person>Tyron Stading</person>
    </item>
    <item @id=DEF>
        <product>Gatoraide</product>
        <company>Pepsi</company>
        <person>John Doe</person>
    </item>
</XML>
```

*Before*

504 ⟶

*After*

```
<XML>
    <item @id=ABC>
        <product @guid=123 @revenue=1B  @retail=100K>WebSphere</product>
        <company @guid=456 @revenue=100B @employees=300000>IBM</company>
        <person @guid=789 @location=Texas @salary=$10>Tyron Stading</person>
    </item>
    <item @id=DEF>
        <product @guid=423 @revenue=XXX @retail=2>Gatoraide</product>
        <company @guid=234 @revenue=XXX @employees=120000>Pepsi</company>
        <person @guid=834 @location=Georgia @salary=1M>John Doe</person>
    </item>
</XML>
```

*FIG. 5*

SYSTEM AND METHOD OF APPLYING GLOBALLY UNIQUE IDENTIFIERS TO RELATE DISTRIBUTED DATA SOURCES

FIELD OF THE DISCLOSURE

The present disclosure is generally related to a system and method of applying globally unique identifiers to relate distributed data sources.

BACKGROUND

In general, public information sources, such as the Internet, present challenges for information retrieval. The volume of information available via the Internet grows daily, and search engine technologies have scaled dramatically to keep up with such growth. Conventionally, search engines, such as those provided by Yahoo, Google, and others, utilize data collection technologies, such as spiders, bots, and web crawlers, which are software applications that access web pages and trace hypertext links in order to generate an index of web page information. The data collected by such software applications is typically stored as pre-processed data on which search engines may operate to perform searches and to retrieve information.

Additionally, a vast amount of data exists that is not accessible to the public Internet (e.g., "dark web" data, internal data, internal application data, private data, subscription database data, other data sources, or any combination thereof). Such data can often be searched via private access interfaces, private search tools, other application program interfaces, or any combination thereof. Such information may be segregated from other information sources, requiring multiple interfaces, multiple protocols, multiple formats, and different database drivers to access the data. Accordingly, information retrieval can be complicated by the variety of data sources.

In general, software has been developed to provide "on-line analytical processing" (OLAP) for collecting, managing, processing, and presenting multidimensional data for analysis and management purposes. Typically, an OLAP interface is customized for each data source. However, such custom interfaces do not readily leverage existing, distributed data sources without significant coding. Further, when an OLAP interface is designed to access multiple data sources, either the multiple data sources are pre-processed to index the data to a searchable index or the multiple data sources are commonly controlled such that the data structures are uniform. Unfortunately, a large amount of data, for example, unstructured data and semi-structured data that is stored on the Internet, may include useful information that cannot readily be correlated to data from other sources.

Conventionally, multiple data sources may include data related by a common attribute. However, such data may not be readily correlated due to differences in data structures, in attribute labels, in data formats, in the data entered, or any combination thereof. For example, in one data source, a company name may be tagged or labeled using the term "company," while another data source may label the data using other terms, such as "business name," "co.," "corporation," other labels, or any combination thereof. Further, even when two data sources have common labels, such as "company," the data is entered in a first data source may be entered differently from the second data source, making it difficult to correlate the data without manual intervention.

SUMMARY

In a particular embodiment, a method includes sending a text string from a source device to a destination device. The destination device includes a unique identifier repository having a plurality of globally unique identifiers mapped text strings, relationship data defining associations between the plurality of globally unique identifiers, and meta-data related to the text string. Each of the plurality of globally unique identifiers includes a data value that is shared by a plurality of data sources as an identifier associated with information related to the text string. The method further includes receiving data including one or more globally unique identifiers, associated relationship data, and associated meta-data from the destination device at the source device in response to sending the text string. Additionally, the method includes storing the received data at a memory of the source device for use in searching and relating search results received from multiple data sources.

In another particular embodiment, a system includes an interface responsive to a network and a unique identifier repository adapted to store mappings between text strings and globally unique identifiers, to store relationship data defining associations between globally unique identifiers, and to store meta-data associated with the text strings. Each globally unique identifier includes a single value that is used as an index by a plurality of data sources to identify particular information. The system further includes processing logic having access to the unique identifier repository. The processing logic is adapted to receive a text string from a source device via the network, to identify at least one globally unique identifier related to the text string at the unique identifier repository, and to send the at least one globally unique identifier, associated relationship data, and associated meta-data to the source device via the network, where the globally unique identifier and associated relationship data are for storage at the source device.

In still another particular embodiment, a system includes a unique identifier repository adapted to store mappings between data strings and globally unique identifiers, to store relationship data representing associations between globally unique identifiers, and to store associated meta-data. Each of the plurality of globally unique identifiers includes a data value that is shared by a plurality of data sources as an identifier associated with information related to the text string. The system further includes processing logic having access to the unique identifier repository and memory accessible to the processing logic. The memory includes instructions that are executable by the processing logic to receive a text string from a source device, to infer an association between the text string and a globally unique identifier from the unique identifier repository, and to send the globally unique identifier, associated relationship data, and associated meta-data to the source device for storage at a memory associated with the source device.

BRIEF DESCRIPTION OF THE DRAWINGS

FIG. 5 is a representative diagram of a particular illustrative example of an extensible markup language (XML) text portion including particular fields and data before and after updating with globally unique identifiers and associated metadata;

DETAILED DESCRIPTION OF ILLUSTRATIVE EMBODIMENTS

In general, a system and method of creating, retrieving and using a globally unique identifier is disclosed. In a particular embodiment, a central clearinghouse is disclosed that hosts a data repository of globally unique identifiers and that is adapted to receive a text string and to identify and provide a globally unique identifier related to the text string to a destination device. The globally unique identifier can be distributed to a plurality of systems for use in retrieving search results and in correlating the search results to provide multi-dimensional results. Further, the central clearinghouse is adapted to store relationship data defining associations between globally unique identifiers as well as meta-data related to the globally unique identifiers. Such relationship data and meta-data can also be provided to the destination device.

In another example, a method is disclosed for sending a text string related to data stored at a source device to a centralized correlation system, which is adapted to determine a globally unique identifier related to the text string from a unique identifier repository. The globally unique identifier and associated relationship data and meta-data are sent to the source device, which receives and stores the globally unique identifier and its associated information at a memory related to the source. In a particular example, the memory can be included in a source device or may be accessible to the source device via a network.

Figure 1:
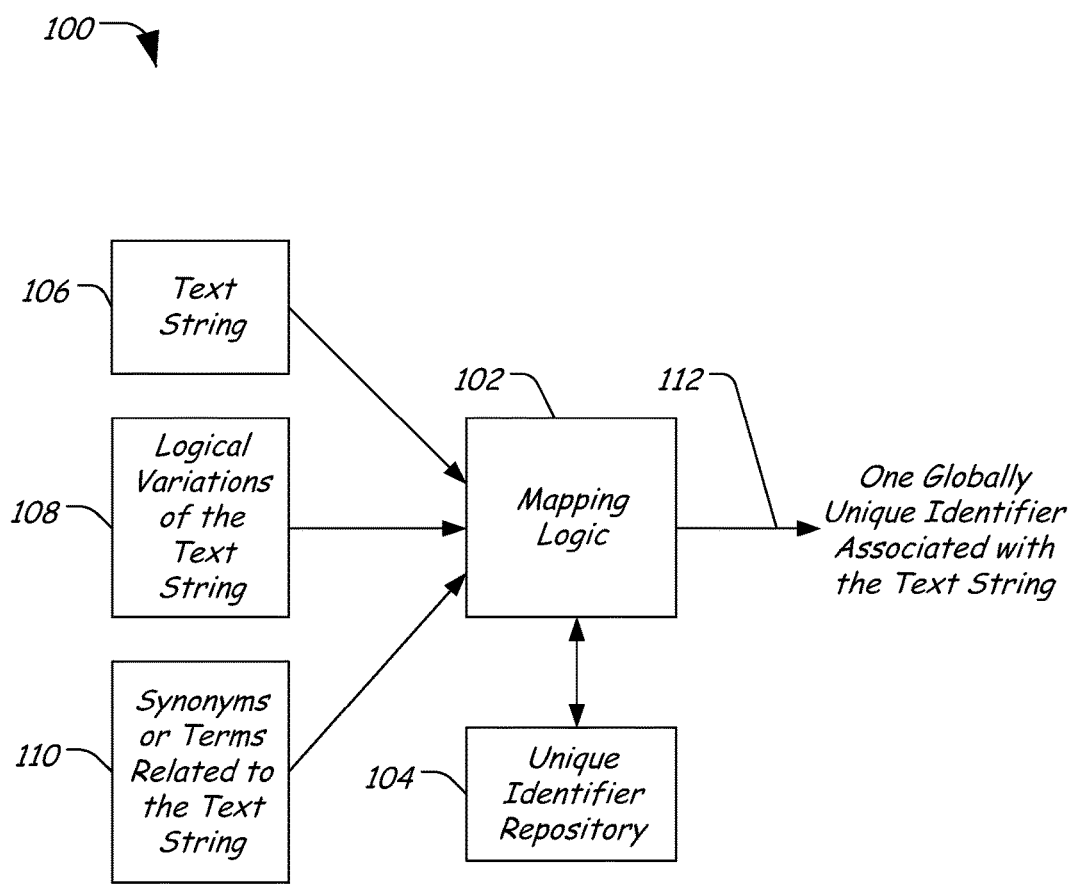
FIG. 1 is a block diagram of a particular illustrative embodiment of a system to map a text string to a globally unique identifier.

FIG. 1 is a block diagram of a particular illustrative embodiment of a system 100 to map a text string to a globally unique identifier. The system 100 includes mapping logic 102 that is coupled to a unique identifier repository 104. The unique identifier repository 104 includes multiple globally unique identifiers where each globally unique identifier uniquely represents particular information. In a particular example, each globally unique identifier is mapped to a unique piece of information, such as a name of a person, a place, a business, a commercial product, a content source (such as a text file, document, database record, or any combination thereof), another piece of information, or any combination thereof. In a particular example, the globally unique identifier can be related to a proper noun, and each globally unique identifier can have a variety of associations or relationships to other globally unique identifiers. In general, each globally unique identifier can have associated relationship data and associated meta-data.

The mapping logic 102 is adapted to receive a text string 106. The mapping logic 102 may also optionally receive logical variations of the text string 108 and synonyms or terms related to the text string 110. In a particular example, heuristics may be applied to the text string 106 to identify variations that reflect common misspellings, common or possible abbreviations, and possible variants related to the text string 106.

The mapping logic 102 is adapted to identify a globally unique identifier from the unique identifier repository 104 that is related to at least one of the text string 106, the logical variations of the text string 108, and the synonyms or terms related to the text string 110. In a particular example, the mapping logic 102 may be adapted to apply statistical analysis to identify a likely globally unique identifier from a plurality of globally unique identifiers based on a context and/or other factors to select a particular globally unique identifier. The mapping logic 102 is adapted to provide the selected globally unique identifier that is associated with the text string to an output 112. In particular, the mapping logic 102 is adapted to provide the selected globally unique identifier, associated relationship data, and associated meta-data to the output 112 and/or to send the selected globally unique identifier, the associated relationship data, and the associated meta-data to a destination device.

In a particular embodiment, the mapping logic 102 and the unique identifier repository 104 may be hosted by a central correlation system, which acts as a repository and clearinghouse (registration source) for globally unique identifiers that can be used to search multiple federated data sources and to relate (correlate or join) search results. New information items can be registered with a globally unique identifier or can be provided to the mapping logic 102 to identify an existing identifier or to create a new globally unique identifier. The globally unique identifier at the output 112 can be sent to a remote device for storage and subsequent use.

In a particular example, the mapping logic 102 is adapted to ensure that each unique identifier is globally unique, at least within an available content space, so that the globally unique identifier can be relied upon to retrieve relevant information and to associate and join information from different data sources along at least one dimension. In a particular example, the globally unique identifier can serve as an edge of a data cube including information from multiple data sources and in various data structures, allowing a search system or other device to provide useful information and to organize the information in ways that may allow for visualizations and other data representations that might not otherwise be possible. To the extent that the mapping logic 102 and the unique identifier repository 104 are managed by a clearinghouse, the mapping logic 102 can guarantee uniqueness of the identifier within the known data space. Further, by using an identifier that includes 128-bits or more, the globally unique identifier is statistically likely to be unique relative to existing serial numbers or identifiers generated independently from the mapping logic 102.

Figure 2:
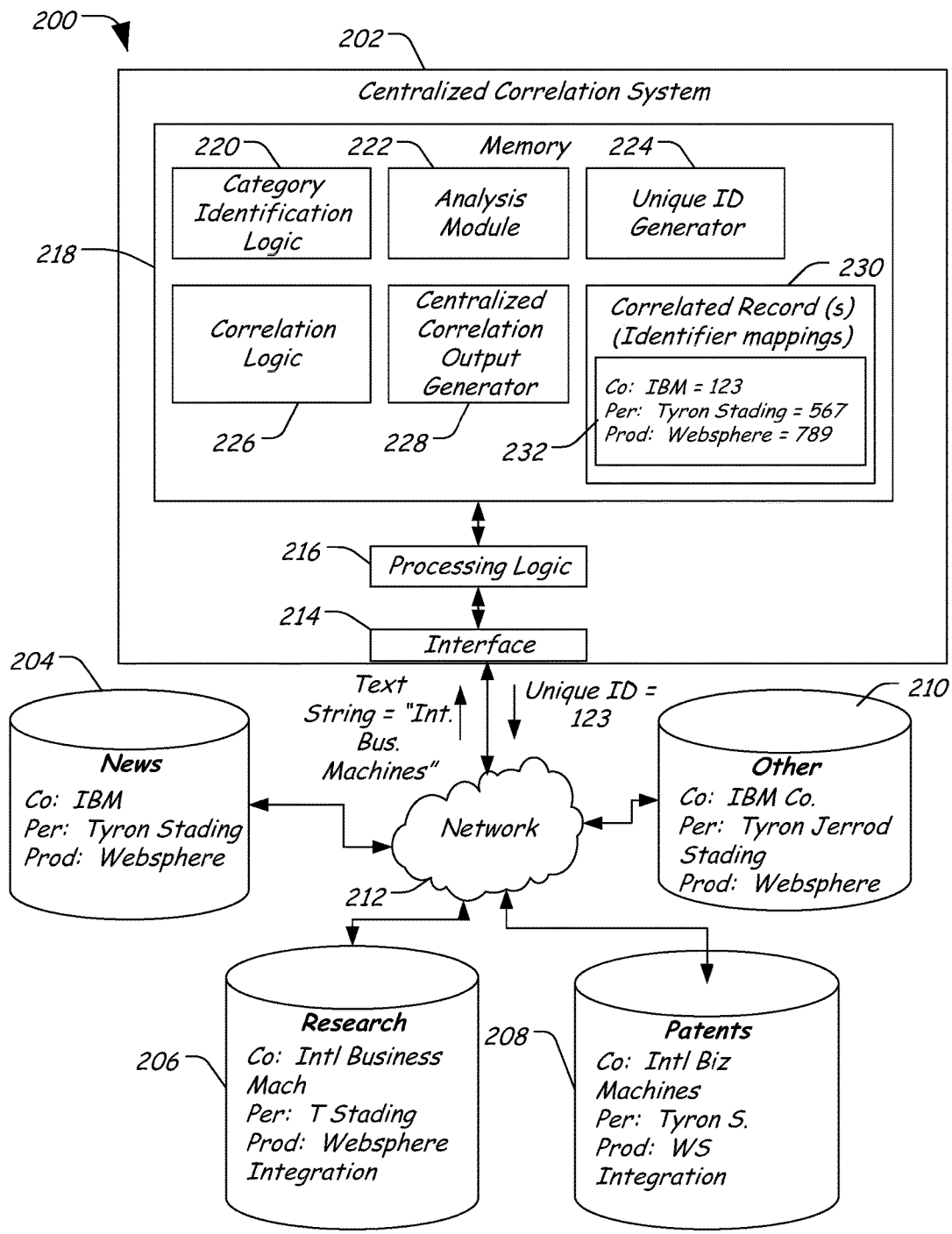
FIG. 2 is a block diagram of a particular illustrative embodiment of a system to relate distributed data sources using globally unique identifiers.

FIG. 2 is a block diagram of a particular illustrative embodiment of a system 200 to relate distributed data sources using globally unique identifiers. The system 200 includes a centralized correlation system 202 that is adapted to communicate with multiple data sources 204, 206, 208 and 210 via a network 212. In a particular example, the network 212 may be a local area network, a wireless network (local or wide area), a wide area network, such as the Internet, or any combination thereof. It should be understood that the data sources 204, 206, 208, and 210 can be server systems, individual computers, stand-alone databases, or any combination thereof. In general, the data sources 204, 206, 208, and 210 can store structured data, semi-structured data (such as tagged data), unstructured (text) data, or any combination thereof.

The centralized correlation system 202 includes an interface 214 that couples the centralized correlation system 202 to the network 212. The centralized correlation system 202 further includes processing logic 216 and memory 218 accessible to the processing logic 216. In a particular example, the centralized correlation system 202 can be distributed across multiple computing systems and the memory 218 and the processing logic 216 can be distributed.

The memory 218 includes a plurality of instructions that are executable by the processing logic 216 to identify and provide a globally unique identifier for use by other systems. The memory 218 includes category identification logic 220 that is executable by the processing logic 216 to determine a category of information related to a particular text string. The memory 218 further includes an analysis module 222 that is executable by the processing logic 216 to apply heuristics to a received text string identify possible typographical errors and to reduce or limit the search. In a particular example, the analysis module 222 may be adapted to identify likely variants of a text string based on a context from which the text string is received. For example, if the text string is derived from a patent search, the analysis module 222 may infer a likely spelling based on a particular technology area. In a particular example, the analysis module 222 may also be adapted to expand a text string to include synonyms. The memory 218 further includes a unique identifier (ID) generator 224, which may be adapted to generate a statistically unique ID value, such as multiple digit number, a 128-bit or 256-bit hexadecimal value, another identifier that includes text and numbers, or any combination thereof, which may be associated with the text string to provide a globally unique identifier.

The memory 218 also includes correlation (mapping) logic 226 that is adapted receive a text string and optionally one or more synonyms and one or more variations of the text string. The correlation logic 226 is adapted to identify a globally unique identifier associated with the received data. In general, the correlation logic 226 is adapted to reduce one or more terms/synonyms/logical variations to a single globally unique identifier from one or more correlated records 230. For example, the one or more correlated records 230 can include a record 232 associated with IBM® that is associated with a globally unique identifier (e.g., globally unique identifier is 123). Additionally, the record 232 also includes other associations, such as a person "Tyron Stading=567", where the number "567" represents another globally unique identifier. Similarly, the record 232 includes a product name (Websphere=789), where the number "789" represents another globally unique identifier. It should be understood that while the globally unique identifiers are illustrated as simple integer values, the numbers can be floating point numbers, hexadecimal numbers, or other types of numbers. Further, while the number is shown as a three-digit number, it should be understood that any number of digits may be used. Further, in a particular embodiment, the correlated records 230 may store multiple globally unique identifiers that a particular globally unique identifier may have associated relationship data and meta-data that relate the particular globally unique identifier to other globally unique identifiers and to other related information.

Further, the memory 218 includes a centralized correlation output generator 228, which may be used to generate an output in a form that can be used by a requesting device. For example, if the requesting device that sends the text string is a database having a particular extensible markup language (XML) schema, the centralized correlation output generator 228 may be adapted to provide the globally unique identifier to the requesting device in an XML format.

In this particular example, the data sources 204, 206, 208, and 210 include the same information entered in different ways. For example, the company name "IBM" is represented in four different ways. Similarly, the individual's name "Tyron Stading" is represented in four different ways. In general, even within a single enterprise, unless strict data entry guidelines are enforced, data can be made difficult to retrieve and correlate because the data is entered differently at each data source.

In a particular embodiment, the data source 206 sends a text string "Int. Bus. Machines" to the centralized correlation system 202 via the network 212. The analysis module 222 can be used by the processing logic 216 to expand the text string to include multiple possible variations. The correlation logic 226 is adapted to identify the record 232 in the correlated records 230 and to determine that the received text string is correlated to the globally unique identifier 123. In this particular example, the centralized correlation output generator 228 provides the globally unique identifier 123 to the data source 206 for inclusion and association with its existing records. Additionally, the centralized correlation output generator 228 can provide relationship data representing associations between the globally unique identifier 123 and other identifiers to the data source 206. Further, the centralized correlation output generator 228 can provide meta-data associated with the globally unique identifier and/or with the relationship data.

In a particular example, by populating multiple data sources with the globally unique identifier (GUID), each of the data sources may be searched using the GUID to retrieve desired information. Further, the GUID can be used to join data received from multiple data sources. For example, the search results from the multiple data sources 204, 206, 208, and 210 can be organized into a data cube with the GUID serving as an edge of the cube. In a particular example, the GUID can be used to join information from multiple data sources, so that the search results can be mined in multiple dimensions. Further, if the multiple data sources 204, 206, 208, and 210 also store the associated meta-data, the search results can be enriched with the meta-data to provide multiple dimension of information.

Figure 3:
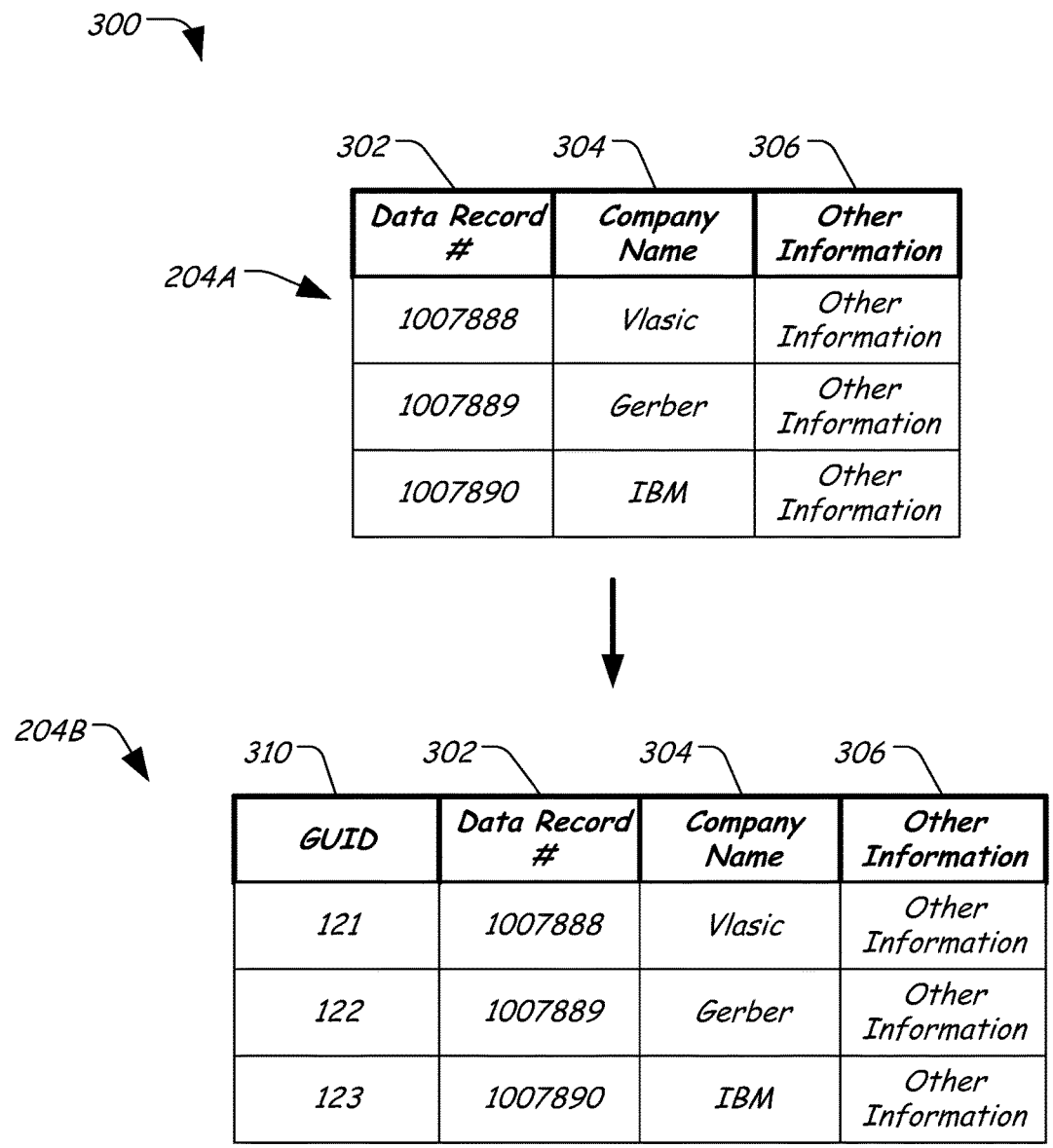
FIG. 3 is a block diagram of a particular illustrative embodiment of a data source that is updated to include a globally unique identifier for existing data.

FIG. 3 is a block diagram of a representative embodiment of a data source 300 that is updated to include a globally unique identifier for existing records. In a particular example, a data source 300, such as the data source 204 illustrated in FIG. 2, includes a plurality of data records 204A, which include an index number 302, a company name 304, and other information 306. In a particular example, the index number 302 may represent a serial number or record number that is unique to the particular data source and which can be used to retrieve individual records.

A host associated with the data source 204 may submit a text string, such as the company name 304, to a centralized correlation server. The centralized correlation server returns a globally unique identifier related to the text string. The globally unique identifier can be stored in the updated plurality of records 204B as a globally unique identifier 310. In general, once the data source is updated with the globally unique identifier 310, its data can be readily joined and correlated with data from other sources using the globally unique identifier 310.

It should be understood that the plurality of records 204B represent only one way of modifying the source information with the received globally unique identifier. Further, if associated relationship data and associated meta-data are received at the data source 300, such relationship data and associated meta-data are not reflected in the updated plurality of records 204B. In this particular instance, such relationship data and associated meta-data may be stored elsewhere or may be disregarded at the data source 300.

Figure 4:
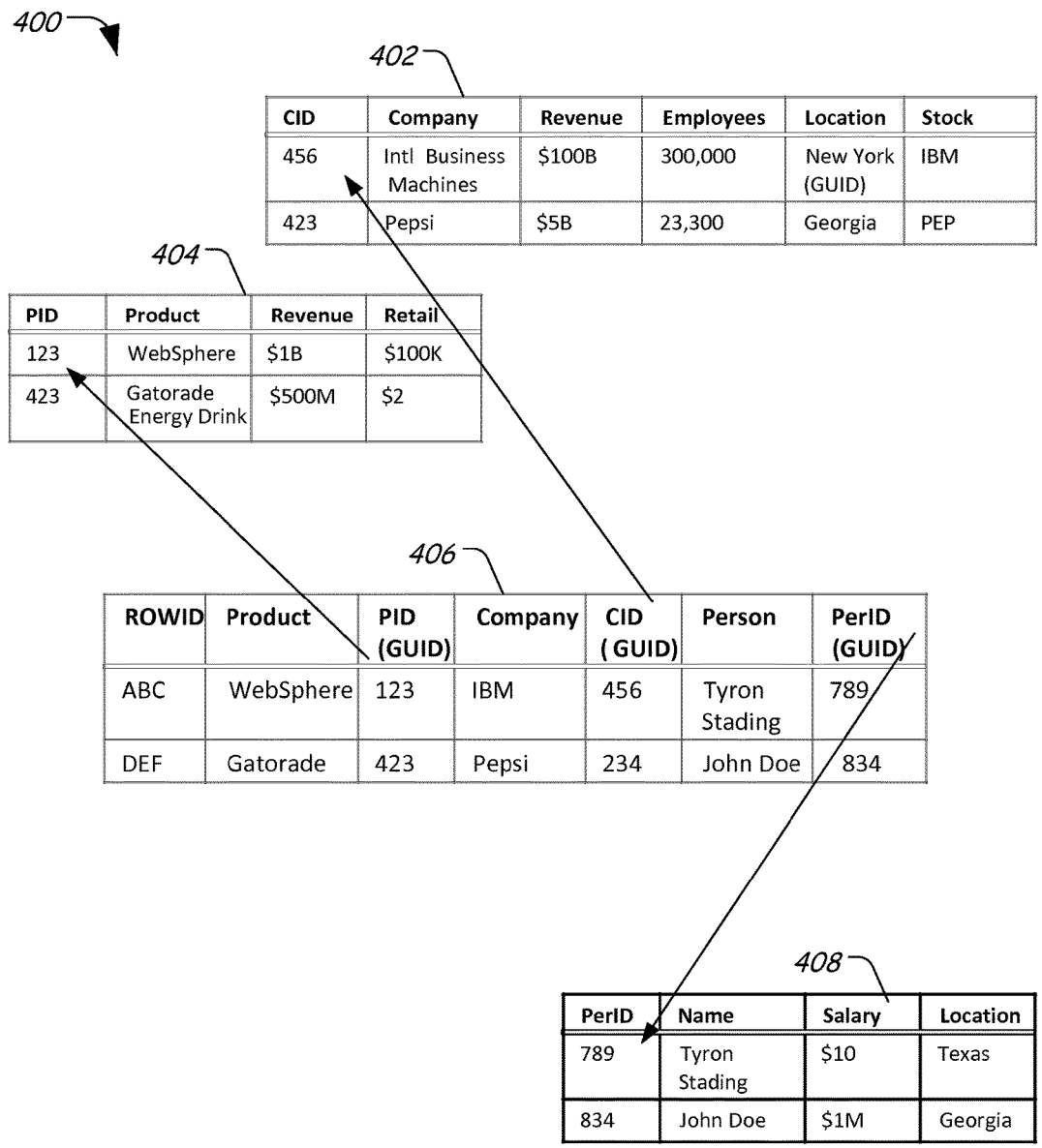
FIG. 4 is a block diagram of a second particular illustrative embodiment of a data source that is updated to include globally unique identifiers for multiple fields within existing data, which may be stored in one or more data sources.

FIG. 4 is a block diagram of a second particular illustrative embodiment of a data source 400 that is updated to include globally unique identifiers for multiple fields within existing data, which may be stored in one or more data sources. The data source 400 includes general corporation information 402 including a company identifier that relates to a globally unique identifier. The data source 400 further includes product information 404 that relates to a product identifier that is a globally unique identifier. Further, the data source includes employee data 408 that includes salary information for particular employees that is related to a globally unique identifier. The data source 400 may also include a table 406 that has a globally unique identifier related to each field. In this instance, each record has a row identifier. Within the first row, for example, the row identifier includes a product name with an associated globally unique identifier (product identifier), a company name with an associated globally unique identifier (company identifier), and a person's name with an associated globally unique identifier (person identifier). The table 406 can include other information, which can be readily associated with corresponding globally unique identifiers located in other data stores at the data source 400 or at a remote data source.

In a particular embodiment, the globally unique identifiers in the table 406 can be exploited to assemble distributed information from various sources to join related information. The table 406 defines an association between the various globally unique identifiers that allows meta-information to be retrieved from sources where the meta-information is unrelated to a particular query. In a particular example, the table 406 represents miniature dimensions between pieces of information in the table 406 as well as data associated with the other data sources 402, 404 and 408, which can be mined using such globally unique identifiers, either locally or via a centralized correlations system.

FIG. 5 is a representative diagram of a particular illustrative example of an extensible markup language (XML) text portion 500 including particular fields and data before and after updating with globally unique identifiers and associated metadata. Before updating from a central correlations system or from a local data source, at 502, particular data is tagged using XML identifiers. For example, a row identifier "ABC" is linked to a product "WebSphere®," to a company name "IBM®," and to a person "Tyron Stading." The XML text portion 502 can be sent to a central correlations system.

At 504, the tagged information is returned from the central correlations system or from the local data source along with globally unique identifiers associated with the particular product, company, and person. Further, metadata can be provided along with the globally unique identifiers, such as revenue and retail data associated with the product, revenue and employee information associated with the company, and location and salary information associated with the person. The globally unique identifiers and the metadata may be stored at a data source, such as the table 406 of the data source 400 illustrated in FIG. 4.

Figure 6:
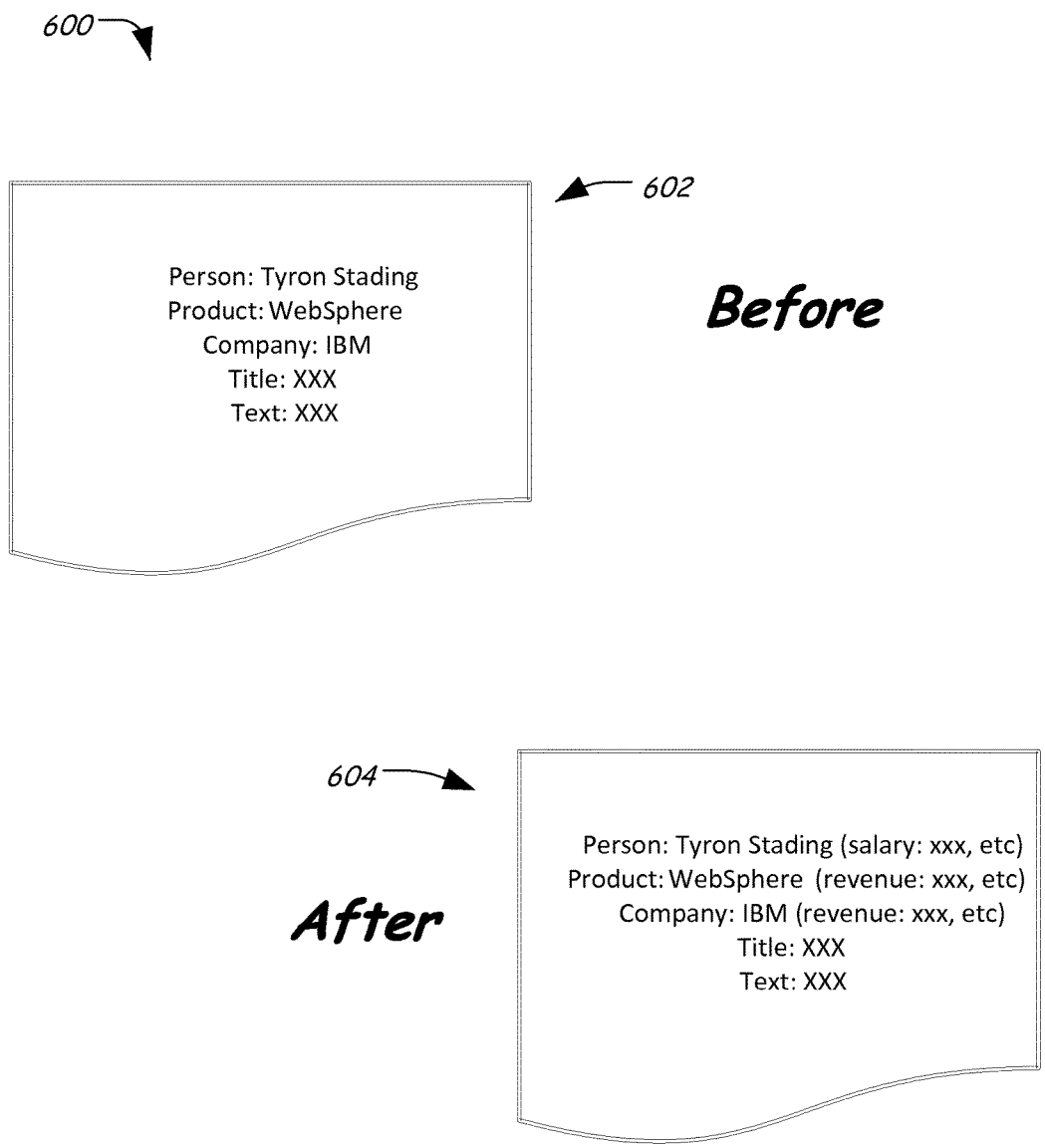
FIG. 6 is a diagram of a particular illustrative example of a document including text data before and after updating with meta-data using globally unique identifiers.

FIG. 6 is a diagram of a particular illustrative example of a document 600 including text data before and after updating with meta-data using globally unique identifiers. Prior to updating, the document 602 includes person information "Tyron Stading," product information "Websphere®," company information "IBM®," title information, and text information.

After updating from a central correlations server or from a local data source, the document 604 includes salary metadata associated with the person information, revenue and other data associated with the product, and company revenue and other company data related to the company. If relationships, meta-data, or any combination thereof, existed for the title and the text, such information could be embedded into the document 604 as well.

In general, the globally unique identifiers can be used to populate documents, reports, and data sources with related information based on associations between globally unique identifiers. In a particular example, miniature dimensions exist between pieces of information in a table that can be mined using such globally unique identifiers, either locally or via a centralized correlations system. Once the globally unique identifiers are stored locally, the information can be used to enrich existing documents and reports with information that might otherwise be difficult to locate and/or that the particular individual might not otherwise be aware of.

Figure 7:
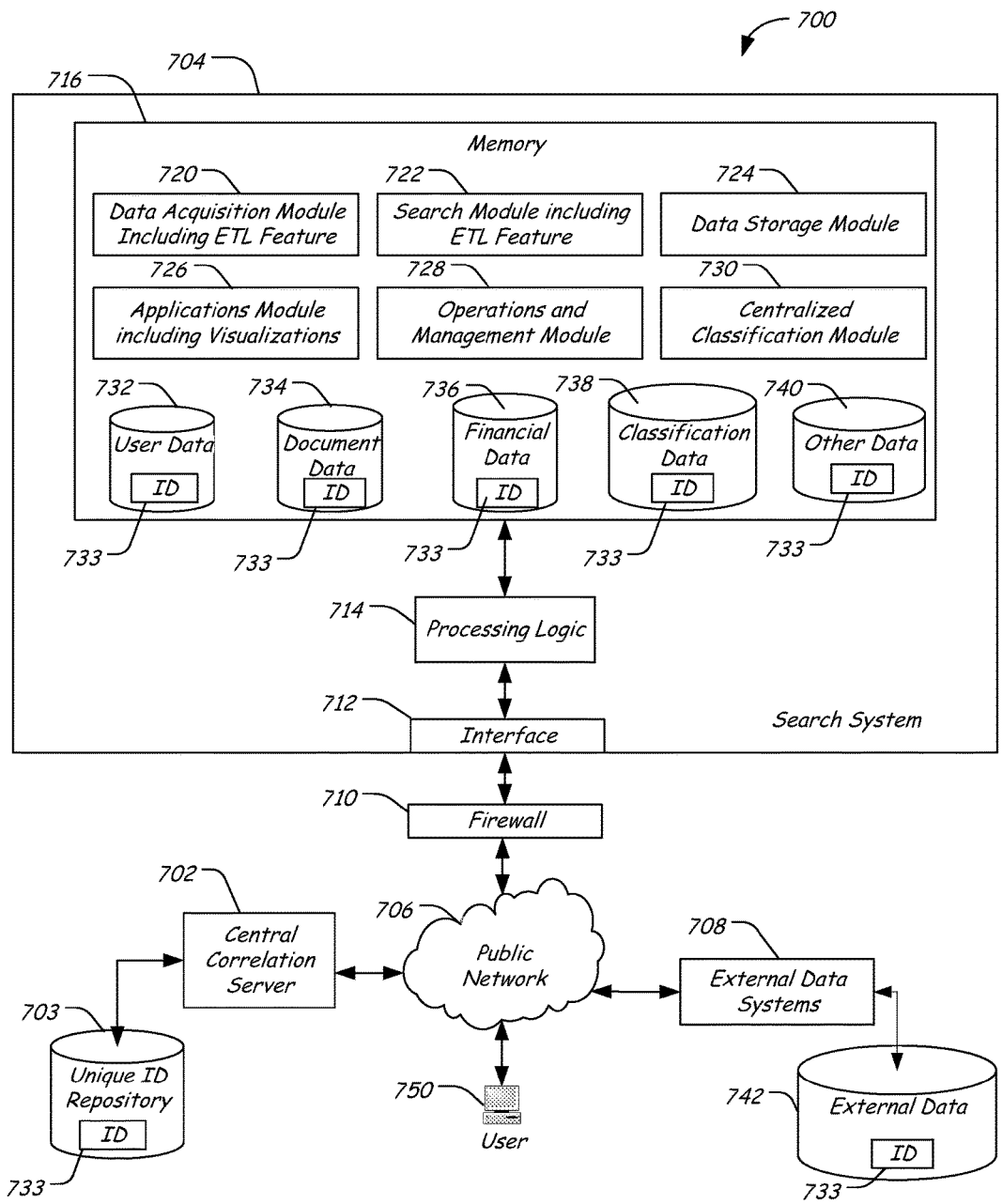
FIG. 7 is a block diagram of a second particular illustrative embodiment of a system to relate distributed data sources globally unique identifiers.

FIG. 7 is a block diagram of a second particular illustrative embodiment of a system 700 to relate distributed data sources globally unique identifiers. The system 700 includes a central correlation server 702 coupled to a unique identifier repository 703. The central correlation server 702 communicates with a search system 704 via a network 706. Further, the central correlation server 702 is communicatively coupled to external data systems 708 via the network 706. The external data systems 708 may be coupled to external data 742. In a particular illustrative embodiment, the network 706 may be a public network (such as the Internet), a private network (such as a corporate intranet, a virtual private network, an enterprise system, or any combination thereof), or any combination thereof. In general, multiple remote devices, such as the user device 750, can communicate with the search system 704 via the network 706. In a particular illustrative embodiment, the user device 750 may represent any device, such as a computer, a web-enabled mobile phone, a personal digital assistant (PDA), a set-top box device, or any combination thereof, that has access to the Internet and that is capable of executing an Internet browser application.

Additionally, the search system 704 may communicate with one or more external data systems 708, such as web sites, commercial databases, libraries, government sites, internal or private data sources, user-generated data (i.e. meta-data, user-tagged data, web logs (blogs), or other user-generated data), other data sources, or any combination thereof. Such external data systems 708 may include structured data (such as pre-processed data, database records, other structured data, or any combination thereof), semi-structured data (such as tagged data, e.g., hypertext markup language (HTML); extensible markup language (XML); formatted data; or any combination thereof), and unstructured data (such as text). In a particular illustrative embodiment, the structured data may include indexed data, such as data that is assembled using an automated software application, such as a spider, a "bot," a software agent, or other software, which commonly is used by search engine applications to index data sources for later retrieval. The search system 704 can communicate via the network 706 with the user device 702, with the external data sources 708, and with other devices via a firewall 710, which provides security to the search system 704 to prevent undesired intrusions.

The search system 704 includes an interface 712 that is responsive to the network 706, processing logic 714 that is coupled to the interface 712, and memory 716 that is accessible to the processing logic 714. In a particular illustrative embodiment, the search system 704 may include multiple servers having separate processors and memory devices, which may cooperate to provide the search system 704. The memory 716 includes a data acquisition module 720, including an extract-transform-load (ETL) feature, which is executable by the processing logic 714 to acquire data from the external data systems 708 and to extract, transform and load the acquired data into one or more data stores, including document data storage 734. In a particular illustrative embodiment, the ETL feature of the data acquisition module 720 can identify missing information (such as missing fields, missing meta-data, garbled information, omitted data, or any combination thereof) and can make probabilistic determinations to assign values in lieu of the missing information. For example, in a particular illustrative embodiment, the data acquisition module 720 identifies missing assignee information associated with a particular patent and makes a probabilistic determination to extrapolate a likely assignee of the patent.

The memory 716 may also include a search module 722 having an ETL feature. The search module 722 can be executed by the processing logic 714 to receive a query, to generate queries to other search engines and to one or more of the other data sources 708, and to extract data from search results (using the ETL feature). In a particular illustrative embodiment, the search module 722 may include a query learner to monitor user interactions with search results, to receive user input related to relevance of selected search results, to determine a desired result based on the user input and the initial query, and to generate new queries based on determining the desired result.

The memory 716 may also include a data storage module 724 that is executable by the processing logic 714 to store retrieved data, metadata, statistics, other data, or any combination thereof. The data storage module 724 may also be adapted to store globally unique identifiers and associated relationships in one or more of a user data storage 732, a document data storage 734, a financial data storage 736, a classification information data storage 738, other data storage 740, or any combination thereof. The user data storage 732 can include user-provided tags (descriptions, meta-data, categories, or other information) related to documents or data associated with other stored information. The user data storage 732 can also include correlations to user-created data, such as spreadsheet data, table data, document data, web log (blog) data, other data, or any combination thereof.

The document data storage 734 can include meta-data about documents (e.g., ownership data, location data, authorship data, date information, classification data, publication/source data, relationship/reference data, embedded tags, other data, or any combination thereof). In a particular illustrative, non-limiting embodiment, the document data storage 734 can include data related to particular structured documents, such as patents, Published patent applications, and other structured documents. In such an instance, the document data storage 734 can include data related to the title, the inventors, the assignee, the priority data, the claims (e.g., number of claims, number of independent claims, claim terms, types of claims, other information, or any combination thereof), the Abstract (e.g., text of the abstract, keywords extracted from the abstract, a number of words in the Abstract, other information related to the abstract, or any combination thereof), the file history (e.g., whether claims were amended during prosecution, a list of cited references, links to file wrapper documents, other information, or any combination thereof), excerpts from the specification that relate to search terms, or any combination thereof. The document data storage 734 may also include various documents, such as Patents, journals, research papers, white papers, product documents, web sites (i.e. as a stored source file), articles, press releases, books, manuals, presentations, reports, sales information, any other document containing text, or any combination thereof.

In a particular illustrative embodiment, the financial data storage 736 can include revenues, profits, credit history, price-to-earnings (P/E) ratio, industry data for classification of tax records, Securities and Exchange Commission (SEC) reports, stock prices, stock trends, other financial data, or any combination thereof, which is related to each particular company. In another particular illustrative embodiment, the financial data storage 736 may also include financial data related to individuals, organizations, associations, other entities that have financial information, or any combination thereof. In still another particular illustrative embodiment, the financial data storage 736 can include other financial information that can be related to any category of interest.

In a particular illustrative embodiment, particular financial data may be added to the financial data storage 736 to provide customized data to a particular enterprise. The financial data storage 736 may also include information that is not financial, but that is related to an entity's structure, size, organization, or other information. For example, the financial data storage 736 may include employee records, number of employees, subsidiary information, corporate officer information, tax jurisdictions, governmental grants (such as a Small Business Innovative Research (SBIR) grants, Small Business Administration (SBA) loans, other governmental grants), press release data, contracts, and other data that is related to the financial data of a particular company, entity, individual, association, or enterprise. In another particular illustrative embodiment, the financial data storage 736 can include enterprise resource planning (ERP) data, sales data, customer relationship management (CRM) data, other enterprise data, or any combination thereof.

In a particular illustrative embodiment, the classification information data storage 738 can include multiple industry classifications and data related to those classifications. For example, the classification information data storage 738 can include a number of companies in each industry, a number of employees of each industry, average salaries of employees, revenues of companies, average revenues, average payroll, average number of companies per classification, other information, or any combination thereof. In a particular illustrative embodiment, the classification information data storage 738 can include location information, which may be summarized by region, state, city, zip code information, or any combination thereof. In a particular illustrative embodiment, the classification information data storage can include normalized classifications that are translated from North American Industry Classification System (NAICS) classifications, Standard Industry Classification (SIC) system classifications, United States Patent and Trademark Office classifications, international classification systems, legal classification systems, Reuter's classifications systems (news release categories), other news services classification systems, or any combination thereof. Additionally, the classification information system can include normalized translations that are translated from any industry-specific taxonomy, including medical indices, semiconductor industry classifications, consumer product classifications, other classifications, or any combination thereof. The classification data storage 738 also includes associations between classifications from various sources. In a particular illustrative embodiment, the classification data storage system 738 can include buyer information and supplier information that is related to a particular industry. In a particular illustrative embodiment, the classification data storage system 738 can include logic to translate or to integrate classifications from various classification systems to an intermediate classification system.

In a particular illustrative embodiment, other data storage 740 can include legal information, such as litigation-related data, including length of cases (start date and end date), decisions/outcomes of the cases, damages requested, damages granted, winners, actions of the cases (i.e. injunction, transfer, court-ordered royalties, other information), the plaintiffs, the defendants, the asserted intellectual property information, jurisdiction information, location information (of the parties, of the court, etc.), rates of settlement, dismissal, verdict, unknown, settlement, statistics, other data, or any combination thereof. The other data storage 740 can also include corporate legal department information, including licensing information, names of legal department contacts, other information, or any combination thereof. In a particular illustrative embodiment, the other data storage 740 can also include corporation data, Securities and Exchange Commission (SEC) filings (i.e. litigation information, including settlements, on-going litigation, and other litigation information extracted from the SEC filings), legislative information, other data, or any combination thereof. In another particular illustrative embodiment, the other data storage 740 can also include person information (i.e. telephone white pages, yellow pages, other people "find" features, or any combination thereof).

In a particular illustrative embodiment, the user data storage 732, the document data storage 734, the financial data storage 736, the classification information data storage 738, and the other data storage 740 may be stored at different servers, which may be in different geographic locations. In another particular embodiment, the user data storage 732, the document data storage 734, the financial data storage 736, the classification information data storage 738 and the other data storage 740 may be stored in a single data store, which may be accessible to one or more servers.

The memory 716 also includes an applications module 726 that is executable by the processing logic 714 to generate graphical maps, charts, dashboard elements, other visual representations or visualizations, or any combination thereof, for visual analysis of a data set, including search results, data derived from the search results, corporate data, industry data, document data, document statistics, other data, or any combination thereof. Additionally, the applications module 726 can be executed by the processing logic 714 to reverse engineer user queries, to track user interactions with search results, and to evaluate explicit user feedback to train a query learner application and a document learner application and to automatically generate new searches. Further, the applications module 726 can be executed by the processing logic 714 to analyze the search results, to apply rules derived from the document learner, to refine the search results, and to produce additional information about the search results.

The memory 716 also includes an operations and management module 728 that is executable by the processing logic 714 to manage subscriber accounts, to manage individual sessions, to generate alerts and other communications, and to control a user experience with the search system 704. In a particular embodiment, the memory 716 further includes a centralized classification module 730 to identify correlations between data stored at different data stores and to generate data related to such correlations, which data may be stored. Depending on the particular implementation, the memory 716 can also include other modules that can be executed by the processing logic 714, such as a graphical user interface (GUI) generator to generate a graphical user interface, including multiple selectable options.

In a particular illustrative embodiment, the search system 704 may provide a graphical user interface (GUI) that may be rendered within an Internet browser application of a remote computing device, such as the user device 702. The GUI may request a username and password, which can be entered via the user device 702 to access the search system 704. The search system 704 receives a username and password via the network 706, verifies the username and password using the operations and management module 728, and retrieves subscriber account information associated with the username and password. For example, the search system 704 may retrieve stored information, including search information, messages, stored analysis, and other information. The search system 704 may generate a GUI that includes selected portions of the stored information.

In a particular illustrative embodiment, the search system 704 can search structured data, semi-structured data, and unstructured data from one or more data sources, can merge search results from each of the data sources, and can provide the search results to the user via a GUI. In a particular embodiment, the processing logic 714 may execute the data acquisition module 720 to extract data from documents associated with the search results and to calculate statistics related to the documents. The processing logic 714 may access the search module 722 to generate queries based on the extracted data or user metadata (such as a role assigned to a particular user, e.g., an administrator role, a guest role, a user role, another role, or any combination thereof). The processing logic 714 performs a secondary search related to the extracted data or metadata. The search system 704 may augment the search results with results from the secondary search.

In a particular embodiment, the search system 704 can retrieve a globally unique identifier 733 from the unique identifier repository 703 via the network 706. The search system 704 can receive the globally unique identifier 733 and store the globally unique identifier 733 at the user data 732, the document data 734, the financial data 736, the classification data 738, and the other data 740. In a particular example, the globally unique identifier 733 can be stored in relation to an associated record, document, or other information to define a globally unique data identifier that can be used to retrieve and associate related data from the various data sources 732, 734, 736, 738, and 740. Further, when the globally unique identifier 733 is also stored at external data 742 of one or more external data systems 708, data retrieved from the external data 742 can be readily retrieved and correlated and/or joined with the data stored at the data stores 732, 734, 736, 738, and 740.

In a particular illustrative embodiment, the centralized classification module 730 can be used to correlate (join or relate) search results from multiple sources using the globally unique identifier 733. Retrieved search results can be joined via the centralized classification module 730 and presented via multi-dimensional visualizations using the applications module 726.

In a particular embodiment, the search system 704 can leverage the globally unique identifier 733 to retrieve and display search results. For example, a user at a user device 750 may submit a text string to the search system 704 via the network 706. The search system 704 uses the centralized classification module 730 to determine a globally unique identifier associated with the text string. If the globally unique identifier cannot be determined, the search system 704 can forward the text string to the central correlation server 702, which can retrieve the appropriate globally unique identifier 733 from the unique data repository 703 and return the globally unique identifier 733 to the search system 704. The search system 704 can then use the text string and/or the globally unique identifier 733 to retrieve and display the search results from multiple data sources.

Figure 8:
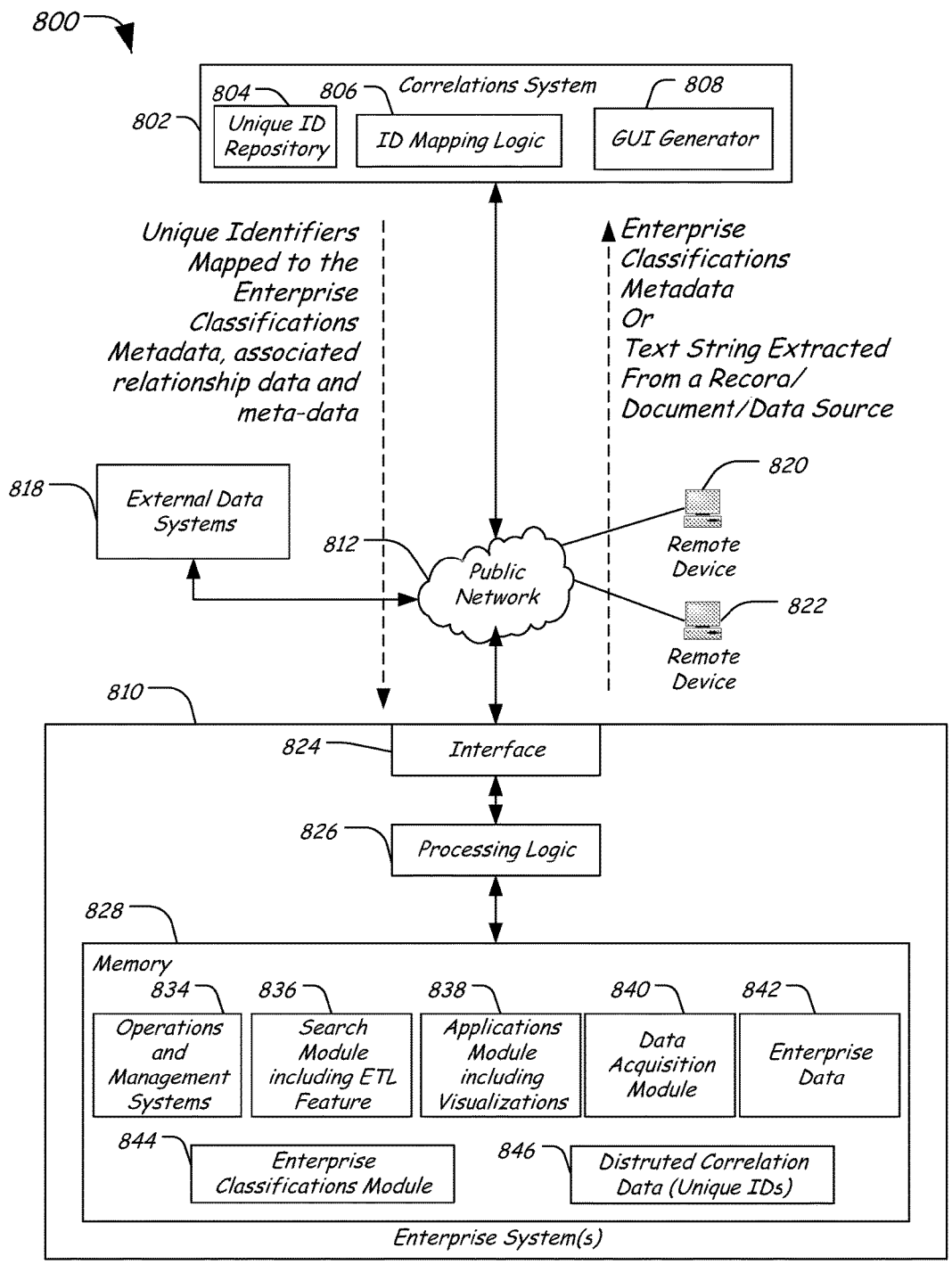
FIG. 8 is a block diagram of a third particular illustrative embodiment of a system to relate distributed data sources using distributed correlations.

FIG. 8 is a block diagram of a third particular illustrative embodiment of a system 800 to relate distributed data sources using distributed correlations. The system 800 includes a correlations system 802 that communicates with an enterprise system 810 via a network 812. The correlations system 802 and the enterprise system 810 can also communicate with external data systems 818 and remote devices 820 and 822 via the network 812.

The correlations system 802 includes a unique identifier (ID) repository 804 that stores mappings between text strings and globally unique identifiers. In a particular example, each globally unique identifier represents a single entity, person, place, product, or other piece of information, and multiple text strings can be related to a single globally unique identifier. Further, the unique ID repository 804 can also store data related to associations between globally unique identifiers. The correlations system 802 further includes identifier mapping logic 806 to receive a text string and to identify a statistically relevant mapping between the text string and a particular globally unique identifier within the unique ID repository 804. Further, the correlations system 802 includes a graphical user interface (GUI) generator 808 adapted to generate a GUI including user selectable indicators to allow a user to modify data and associations related to a particular globally unique identifier from the unique ID repository 804.

The enterprise system 810 includes an interface 824 that is coupled to the network 812. The enterprise system 810 further includes processing logic 826 coupled to the interface 824 and a memory 828 that is accessible to the processing logic 826. The memory 828 includes a plurality of modules or instructions that are executable by the processing logic 826. The memory 828 includes an operations and management systems module 834 adapted to manage access to enterprise system 810. The memory 828 further includes a search module including extract/transform/load (ETL) features 836 that is executable by the processing logic 826 to search multiple data sources and to extract, transform and store portions of the search results. The memory 828 also includes an applications module including visualizations 838 that is executable by the processing logic 826 to perform operations on search results and to display the search results in various graphs, charts, or other visualizations to assist a user in data analysis. The memory 828 also includes a data acquisition module 840 adapted to receive information and to provide the information to the search module 836 for performing ETL operations on the acquired information. The memory 828 may also include enterprise data 842 and distributed correlations data (globally unique identifiers) 846. In a particular example, the enterprise data 842 may be proprietary data, which is maintained by an enterprise. It may be desirable to leverage the proprietary data with publically or privately maintained data from external data system 818.

The memory 828 may also include an enterprise classifications module 844 that is executable by the processing logic 826 to classify search results and information and to associate information from various sources using context and globally unique identifiers from the distributed correlation data 846 to relate the search results.

In a particular embodiment, the enterprise system 810 can request and receive globally unique identifiers for particular information stored in the enterprise data 842. The enterprise classifications module 844 is adapted to associate the received globally unique identifiers with information already stored at the enterprise data 842. The enterprise system 810 can use the globally unique identifier in conjunction with the search module 836. In particular, a user can submit a text string to the enterprise system 810 to initiate a search for data. The enterprise system 810 can use the search module 836 to retrieve one or more globally unique identifiers associated with the text string either from the distributed correlation data 846 or from the unique identifier repository 804. The search module 836 can then to retrieve data associated with the one or more globally unique identifiers from multiple data sources. The enterprise system 810 can use the applications module 838 to join (correlate) search results from the multiple data sources using the globally unique identifier and to provide the correlated search results to the user via one or more visualizations included in a graphical user interface.

Figure 9:
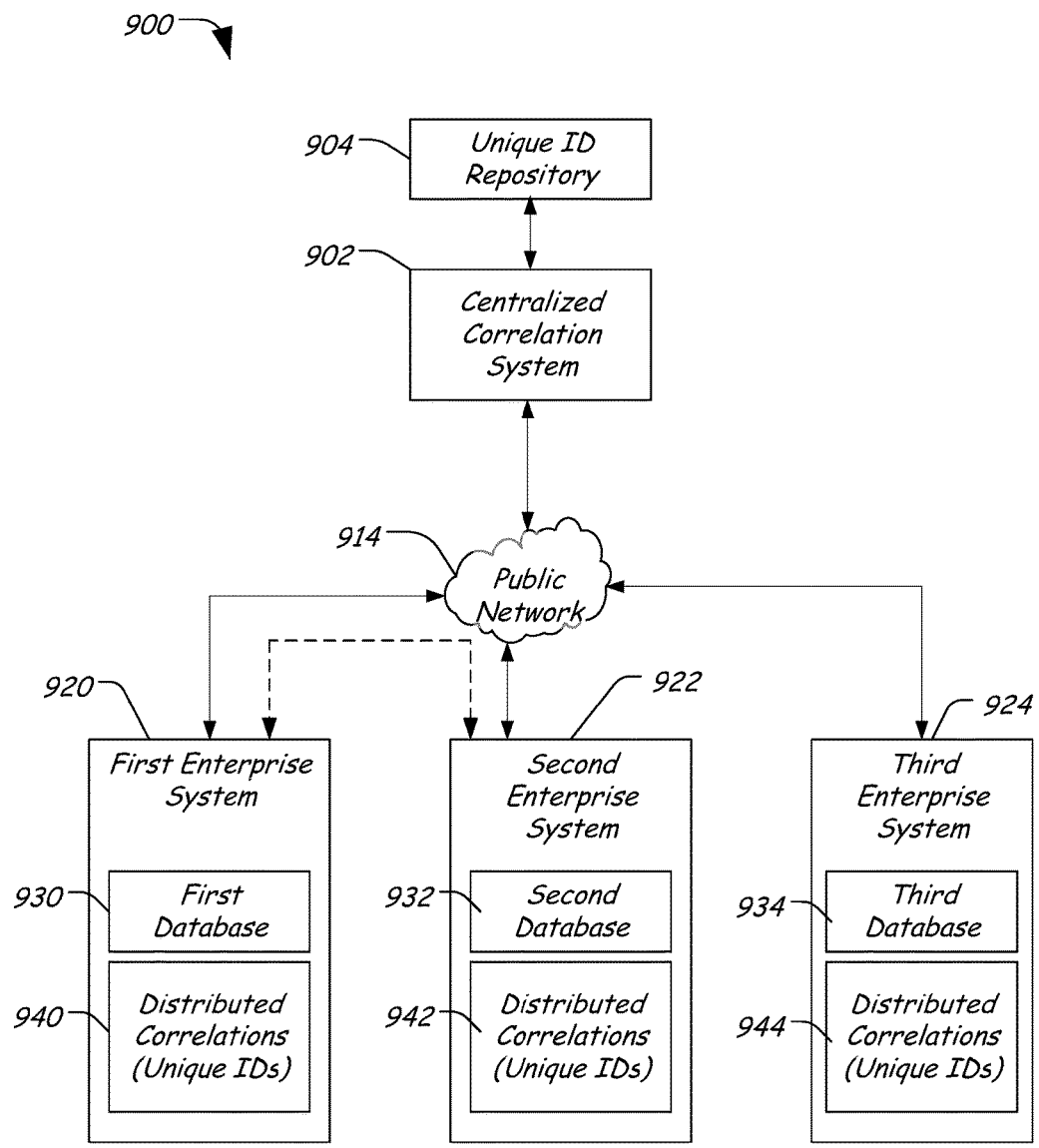
FIG. 9 is a block diagram of a fourth particular illustrative embodiment of a system to relate distributed data sources using distributed correlations.

FIG. 9 is a block diagram of a fourth particular illustrative embodiment of a system 900 to relate distributed data sources using distributed correlations. The system 900 includes a centralized correlation system 902 that is coupled to a unique identifier (ID) repository 904. The centralized correlation system 902 is adapted communicate with first, second, and third enterprise systems 920, 922, and 924 via a network 914. The first enterprise system 920 includes a first database 930 and distributed correlations (globally unique identifiers) 940 from the centralized correlation system 902. The second enterprise system 922 includes a second database 932 and distributed correlations (globally unique identifiers) 942 from the centralized correlation system 902. The third enterprise system 924 includes a third database 934 and distributed correlations (globally unique identifiers) 944 from the centralized correlation system 902. In a particular embodiment, the distributed correlations 940, 942, and 944 can be stored in the first, second, and third databases 930, 932, and 934, respectively.

In a particular example, the distributed correlations 940, 942, and 944 may be identical. In another particular example, the distributed correlations 940, 942, and 944 may vary based on when a particular set of distributed correlations was last updated from the unique ID repository 904. Further, the particular distributed correlations 940 at the first enterprise system 920 may include globally unique identifiers associated with data at the first database 930, while the distributed correlations 942 at the second enterprise system 922 can include globally unique identifiers associated with data stored in the second database 932. Depending on the content of the first, second and third databases 930, 932, and 934, the associated distributed correlations 940, 942, and 944 may also vary.

In a particular embodiment, the globally unique identifier can be used to perform peer-to-peer data retrieval and to join search results retrieved from multiple data sources, such as the first, second and third databases 930, 932, and 934. It should be understood that the first, second, and third databases 930, 932 and 934 may be data sources other than databases, such as data files, tables, document storage, or other types of data sources. Further, it should be understood that the distributed correlations can be used to relate to various types of data, including structured, semi-structured, and unstructured (text) data.

Figure 10:
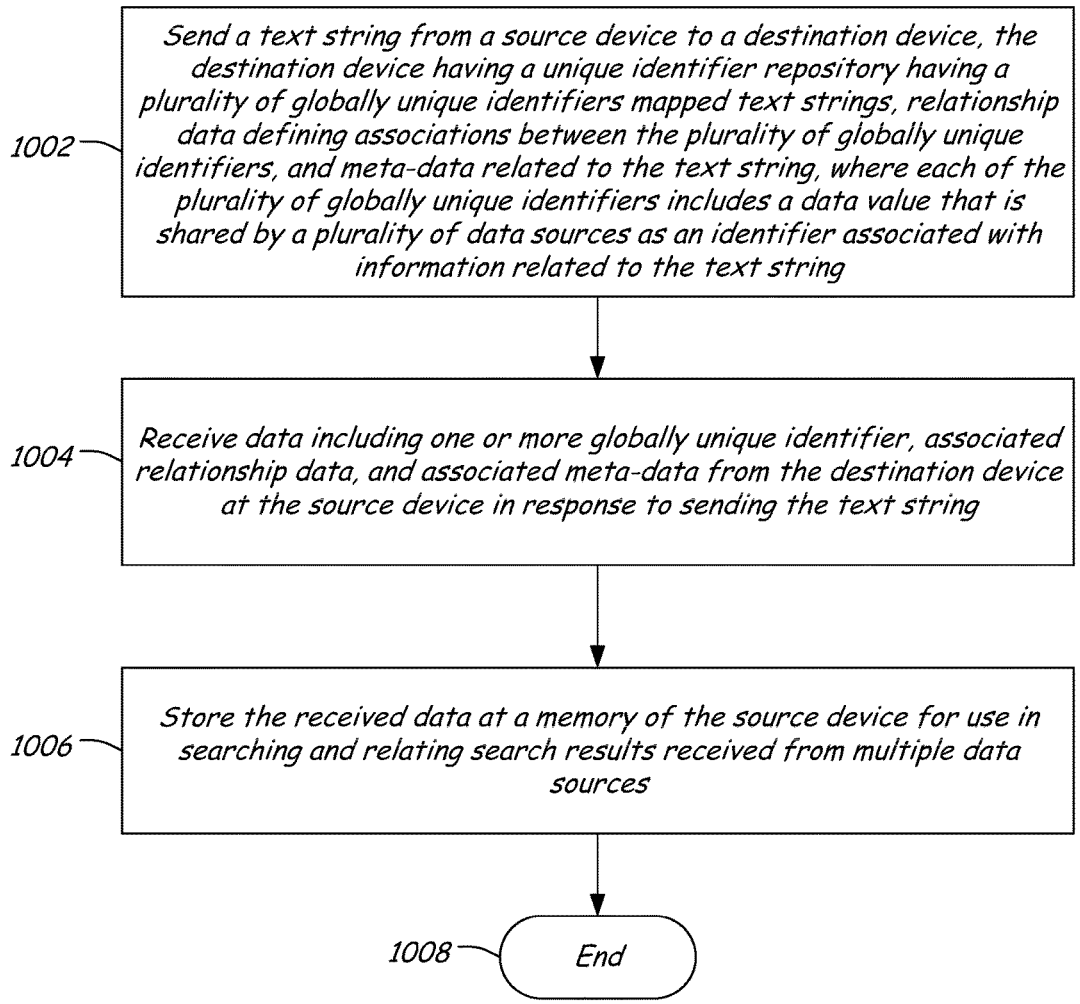
FIG. 10 is a flow diagram of a particular illustrative embodiment of a method of distributing globally unique identifiers for searching multiple data sources and for correlating search results.

FIG. 10 is a flow diagram of a particular illustrative embodiment of a method of distributing globally unique identifiers for searching multiple data sources and for correlating search results. At 1002, a text string is sent from a source device to a destination device, which has a unique identifier repository having a plurality of globally unique identifiers mapped text strings, relationship data defining associations between the plurality of globally unique identifiers, and meta-data related to the text string, where each of the plurality of globally unique identifiers includes a data value that is shared by a plurality of data sources as an identifier associated with information related to the text string. In a particular embodiment, the globally unique identifier is an American Standard Code for Information Interchange (ASCII) character string that is uniquely related (mapped) to a proper noun. In general, the destination device may be a central correlation server, a centralized globally unique identifier repository, a local database of identifiers, or any combination thereof. Additionally, the unique identifier repository can store relationships between globally unique identifiers to facilitate correlations.

Advancing to 1004, data is received that includes one or more globally unique identifiers, associated relationship data, and associated meta-data from the destination device at the source device in response to sending the text string. Moving to 1006, the received data are stored at a memory of the source device for use in searching and relating search results received from multiple data sources. In a particular embodiment, the memory of the source device comprises a random access memory (RAM), a buffer memory, another temporary storage, or any combination thereof. In another particular embodiment, the memory comprises a non-volatile memory, database, or other data storage device to which the source device has access. The method terminates at 1008.

In a particular embodiment, the method includes extracting the text string from a document at the source device and sending the extracted text string to the destination device. The method may also include associating the globally unique identifier with the document and storing the globally unique identifier and the document in the memory of the source device. In another particular embodiment, the method also includes searching multiple data sources using a query that is related to the globally unique identifier and joining results from multiple data sources using the globally unique identifier to correlate the results.

Figure 11:
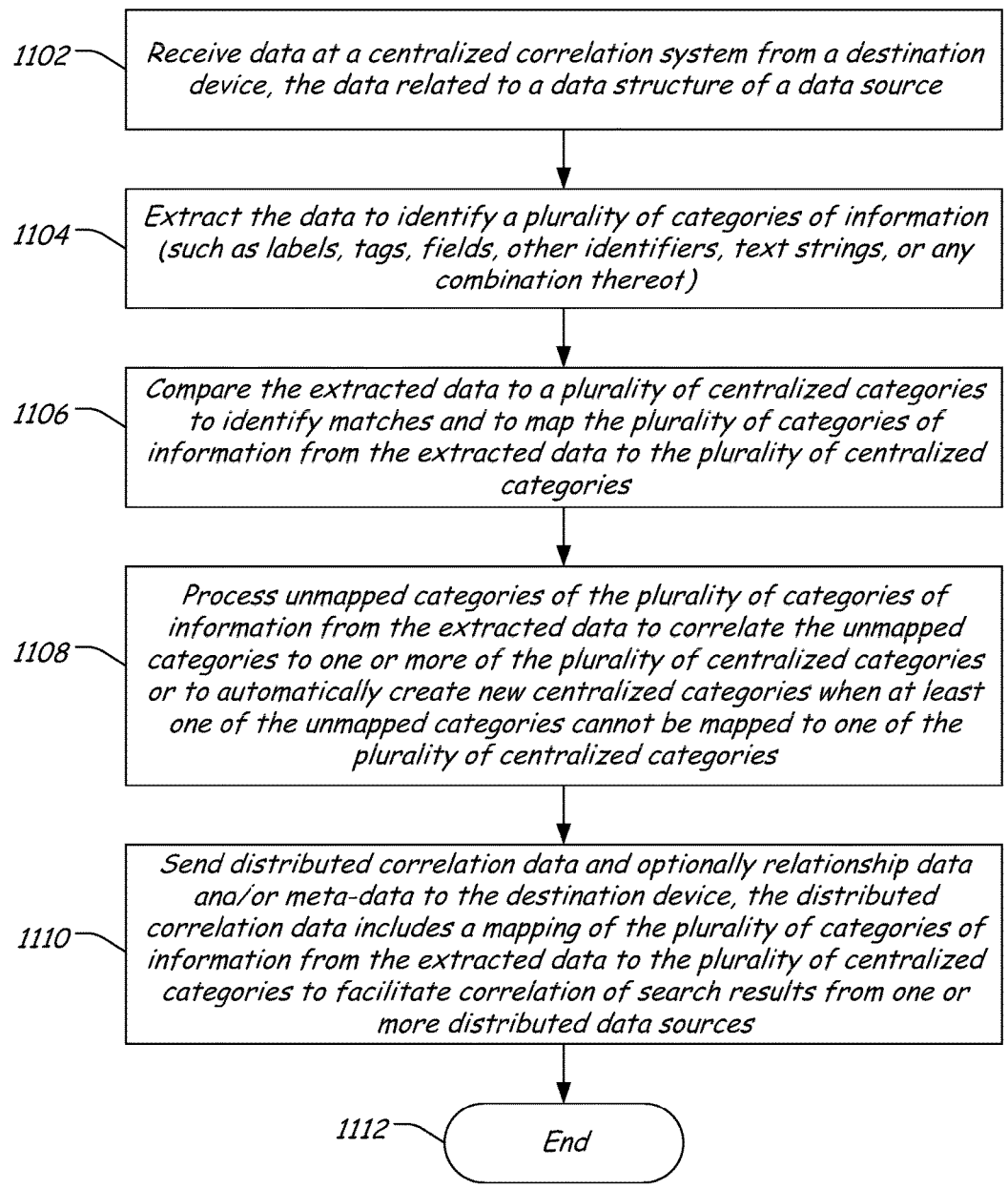
FIG. 11 is a flow diagram of a particular illustrative embodiment of a method of generating a globally unique identifier related to a received text string.

FIG. 11 is a flow diagram of a particular illustrative embodiment of a method of generating a globally unique identifier related to a received text string. At 1102, data is received at a centralized correlation system from a destination device, where the data is related to a data structure of a data source at the destination device. In a particular embodiment, the data is a text string that is extracted from a document at the data source. In another particular embodiment, the data is a schema or data structure related to a database or to a semi-structured data source such as a set of tagged documents.

Advancing to 1104, the data is extracted to identify a plurality of information, such as labels, tags, fields, other identifiers, or any combination thereof, as well as to identify proper nouns and other text strings. Continuing to 1106, the extracted data is compared to a plurality of centralized categories (globally unique identifiers) to identify matches and to map the plurality of categories of information from the extracted data to a plurality of centralized categories or globally unique identifiers. Proceeding to 1108, unmapped categories of the plurality of categories of information from the extracted data are processed to correlate the unmapped categories to one or more of the plurality of centralized categories or to automatically create new centralized categories when at least one of the unmapped categories cannot be mapped to one of the plurality of centralized categories. Continuing to 1110, distributed correlation data and optionally relationship data and/or meta-data are sent to the destination device, where the distributed correlation data includes a mapping of the plurality of categories of information from the extracted data to the plurality of centralized categories to facilitate a correlation of search results from one or more distributed data sources. The method terminates at 1112.

In a particular embodiment, a document or data source can be parsed to extract fields and associated data, and one or more globally unique identifiers can be retrieved from a unique identifier repository that are related to the extracted fields and associated data. In a particular example, globally unique identifiers and relationships between globally unique identifiers can be mapped to the extracted fields and associated data.

Figure 12:
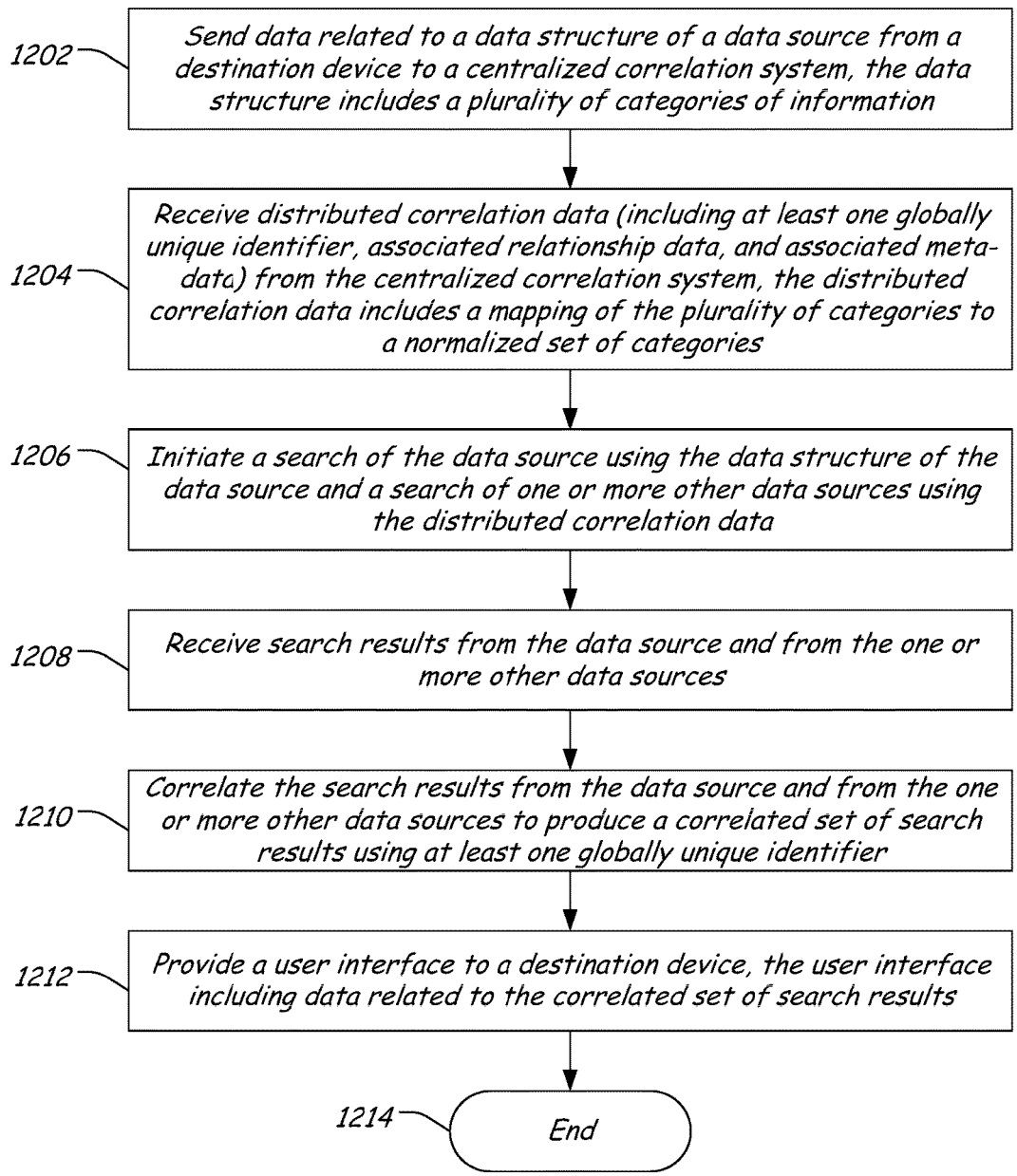
FIG. 12 is a flow diagram of a particular illustrative embodiment of a method of registering a globally unique identifier received from a source.

FIG. 12 is a flow diagram of a particular illustrative embodiment of a method of registering a globally unique identifier received from a source. At 1202, data related to a data structure of a data source are sent from the data source to a centralized correlation system, where the data structure includes a plurality of categories of information. In a particular embodiment, the plurality of categories of information includes multiple globally unique identifiers and relationship data defining associations between at least some of the multiple globally unique identifiers. Moving to 1204, distributed correlation data are received from the centralized correlation system, where the distributed correlation data includes a mapping of the plurality of categories to a normalized set of categories, such as a set of globally unique identifiers. In a particular example, the normalized set of categories represents mappings between the data and related globally unique identifiers as well as relationships between the globally unique identifiers. In a particular embodiment, the distributed correlation data includes at least one globally unique identifier, associated relationship data, and associated meta-data.

Advancing to 1206, a search of a data source is initiated using the data structure of the data source and a search of one or more other data sources using the distributed correlation data (i.e., at least one globally unique identifier). In a particular embodiment, the globally unique identifiers are utilized to search the data source and one or more other data sources. Continuing to 1208, search results are received from the data source and from the one or more other data sources. Proceeding to 1210, the search results from the data source and from the one or more other data sources are correlated to produce a correlated set of search results using at least one globally unique identifier. In a particular embodiment, the globally unique identifier can be used to relate data received from the various data sources. In a particular example, the search results constitute a data cube having an edge defined by at least one globally unique identifier.

Advancing to 1212, a user interface is provided to a destination device, where the user interface includes data related to the correlated set of search results. In a particular example, the data may be provided using an applications module or graphical user interface (GUI) generator that can present the search results in one or more formats, including a list of ranked search results, a graph, a chart, another type of visualization, or any combination thereof. The method terminates at 1214.

Figure 13:
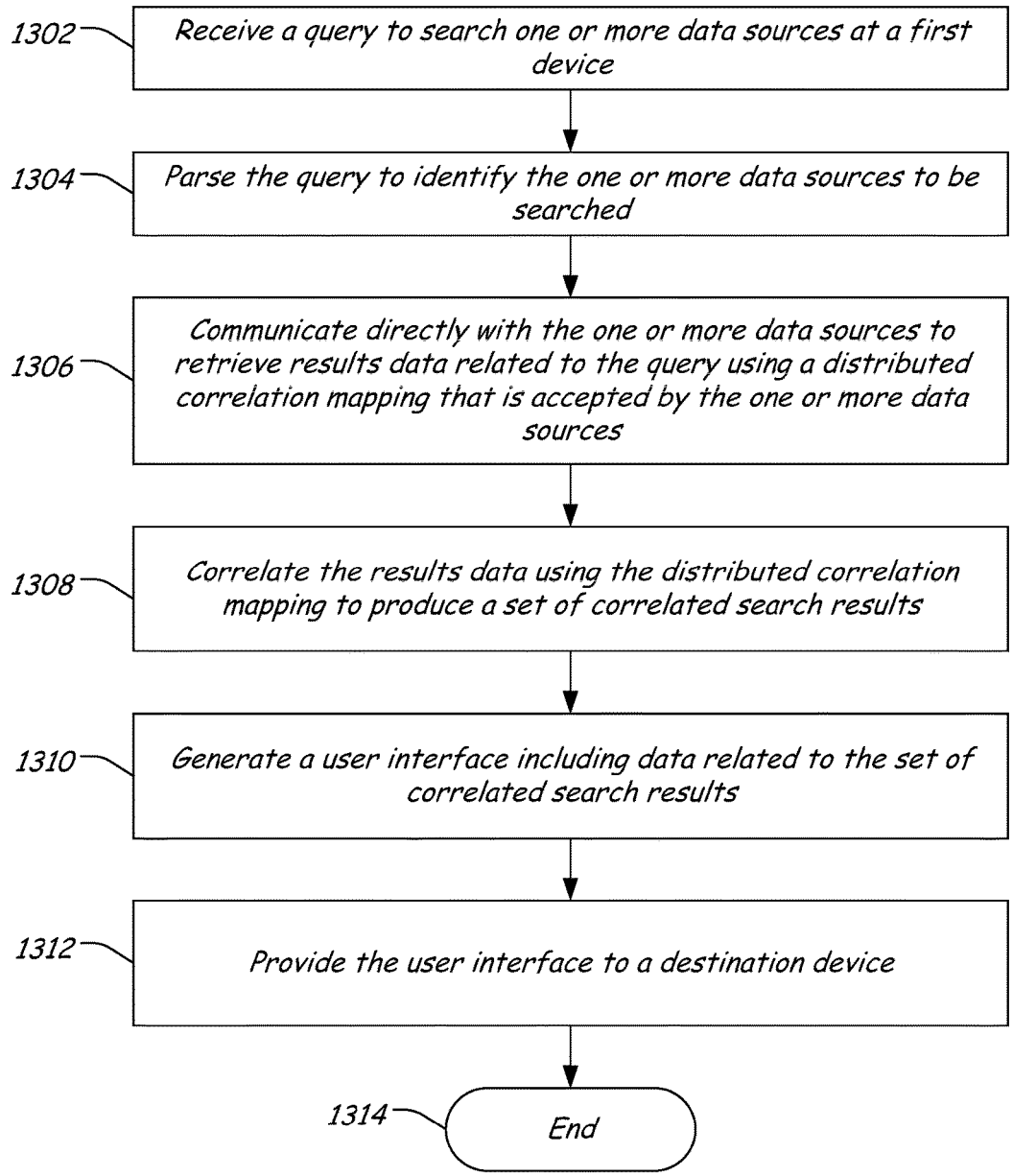
FIG. 13 is a flow diagram of a particular illustrative embodiment of a method of providing a user interface to a destination device based on search results retrieved from federated data sources and correlated using a globally unique identifier.

FIG. 13 is a flow diagram of a particular illustrative embodiment of a method of providing a user interface to a destination device based on search results retrieved from federated data sources and correlated using a globally unique identifier. At 1302, a query is received to search one or more data sources at a first device. Advancing to 1304, the query is parsed to identify the one or more data sources to be searched. Continuing to 1306, the first device communicates with the one or more data sources directly to retrieve results data related to the query using a distributed correlation mapping that is accepted by the one or more data sources. In a particular example, the distributed correlation mapping includes a first globally unique identifier associated with the query and one or more other globally unique identifiers having a relationship with the first globally unique identifier. The relationship may be determined from relationship data defining an association between globally unique identifiers. Each of the one or more data sources to be searched may include at least some of the globally unique identifiers from a central unique identifier repository.

Proceeding to 1308, the results data is correlated using the distributed correlation mapping to produce a set of correlated search results. In a particular example, the globally unique identifier and relationship data can be used to produce a data cube having an edge defined by at least one globally unique identifier. Further, the globally unique identifier and relationship data can be used to produce search results having multiple related dimensions, and the globally unique identifier and relationship data can be used to identify the relationships and to display the results. Continuing to 1310, a user interface is generated that includes data related to the set of correlated search results. The user interface may include one or more visualizations of the data, a list of search results, one or more user-selectable indicators for interacting with the data, or any combination thereof. In a particular embodiment, the data related to the set of search results includes globally unique identifiers, associated relationship data, and associated meta-data, which augment the search results in multiple dimensions for enriched data mining. Moving to 1312, the user interface is provided to a destination device. In a particular example, the destination device may include an Internet browser or another application in which the user interface may be rendered for display to a user. The method terminates at 1314.

Figure 14:
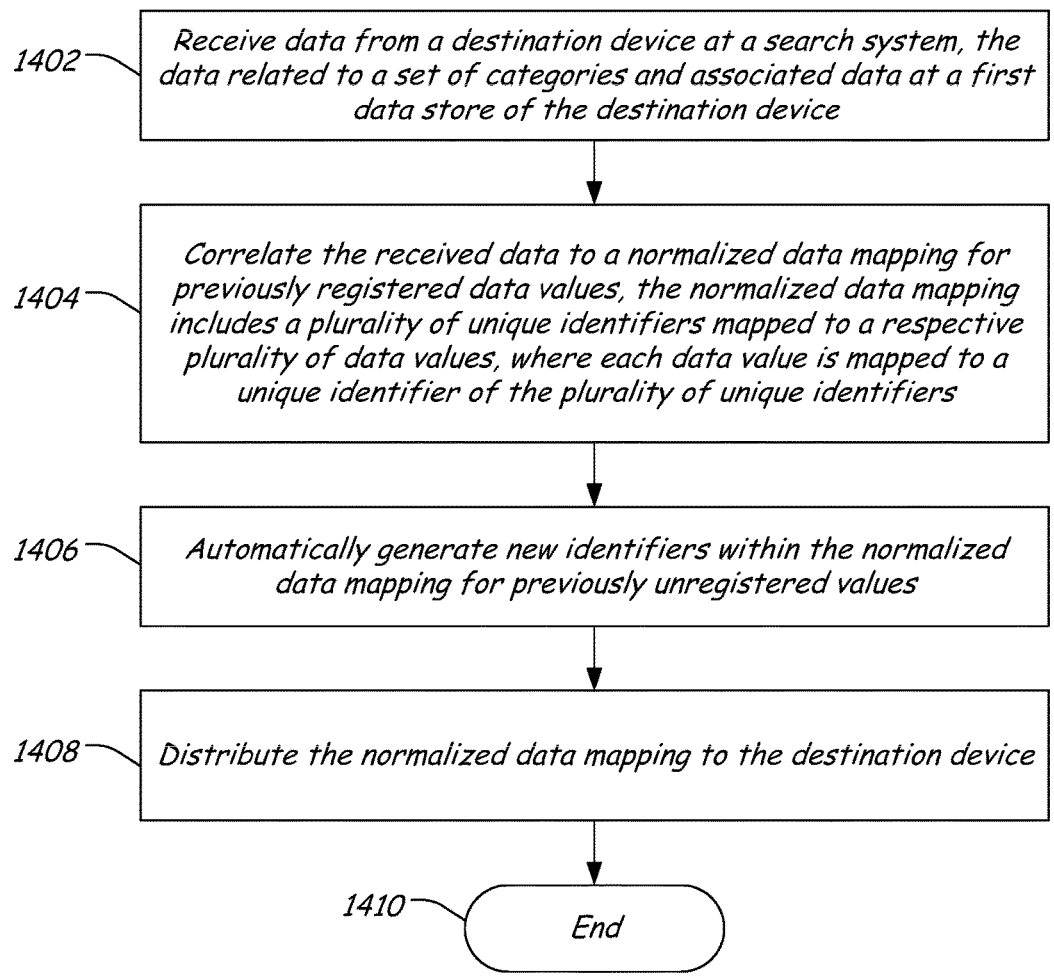
FIG. 14 is a flow diagram of a particular illustrative embodiment of a method of determining a globally unique identifier from a unique identifier repository based on a text string or a data set.

FIG. 14 is a flow diagram of a particular illustrative embodiment of a method of determining a globally unique identifier from a unique identifier repository based on a text string or a data set. At 1402, data are received from a destination device at a search system, where the data is related to a set of categories and associated data of a first data store of the destination device. Continuing to 1404, the received data are correlated to a normalized data mapping for previously registered data values, where the normalized data mapping includes a plurality of unique identifiers mapped to a respective plurality of data values and where each data value is mapped to a unique identifier of the plurality of identifiers. In a particular embodiment, the data are normalized by expanding the data to include logical variations and synonyms, which can be searched within the plurality of identifiers to retrieve one or more globally unique identifiers.

Proceeding to 1406, new identifiers are automatically generated within the normalized data mapping for previously unregistered values. For example, after searching, if no globally unique identifier is found, a new globally unique identifier may be generated for the data, and an interface may be provided to allow a user, such as an operator, administer, or other user to supplement the record with association information. In a particular example, the interface may be a web-interface, such as a Wiki-type web-interface that allows any registered user to supplement a particular registered information item. Advancing to 1408, the normalized data mapping is distributed to the destination device. In a particular example, if the globally unique identifier is new, few if any relationship data may be available. However, over time, existing globally unique identifiers may have relationship data that defines associations between globally unique identifiers. In a particular embodiment, the globally unique identifier and associated relationship data may be provided to the destination device (such as a user device) in response to receiving a query. The method terminates at 1410.

Figure 15:
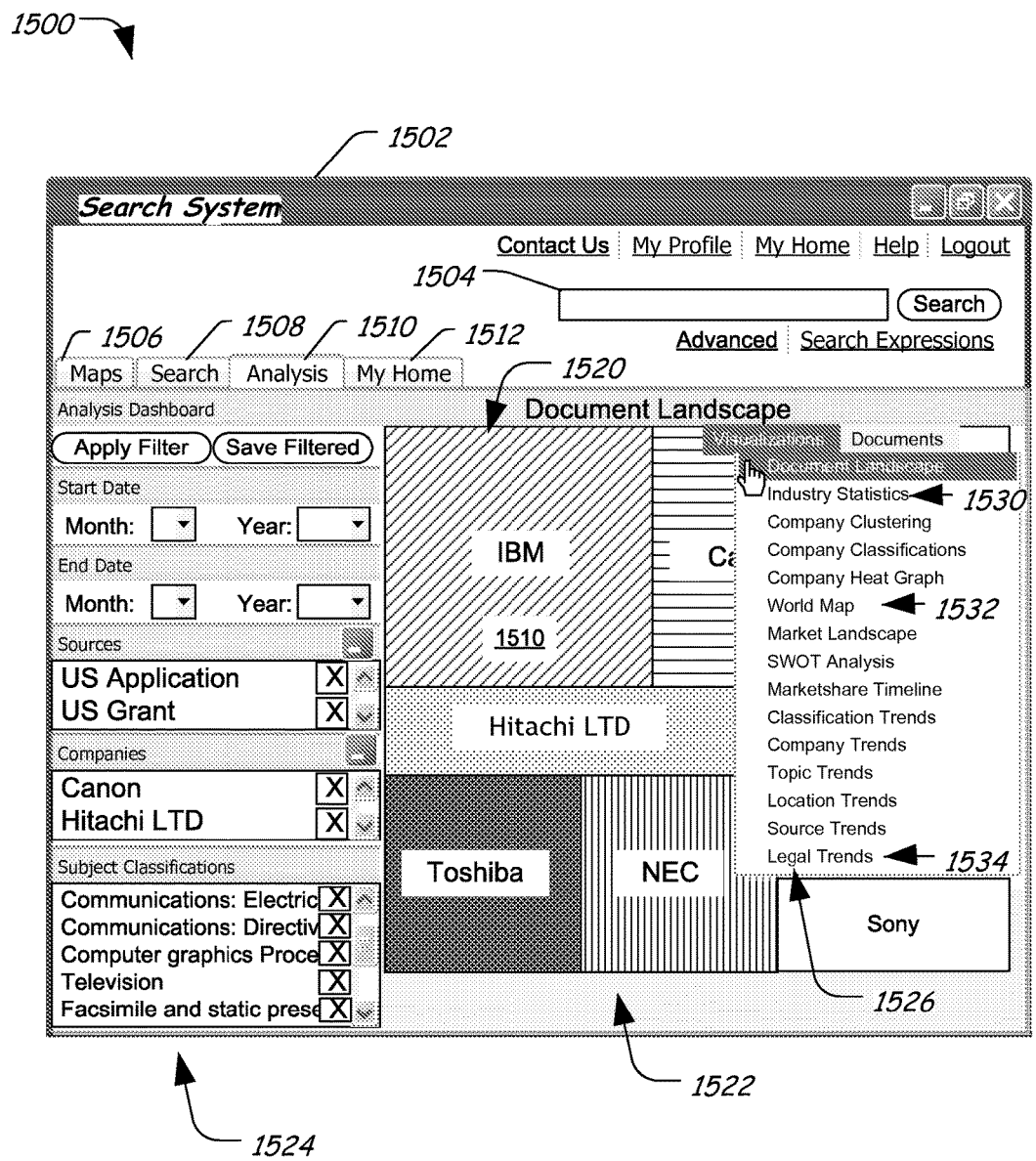
FIG. 15 is a diagram of a particular illustrative embodiment of a graphical user interface including a plurality of user selectable indicators accessible to a user to access a correlated set of search results from distributed data sources.

FIG. 15 is a diagram of a particular illustrative embodiment of a graphical user interface 1500 including a plurality of user selectable indicators accessible to a user to access a correlated set of search results from distributed data sources. In general, the graphical user interface 1500 may be provided to a remote device to display correlated data, which data is correlated using at least one globally unique identifier. The graphical user interface 1500 includes a window 1502 that includes a text input 1504, and user selectable tabs, including a "maps" tab 1506, a "search" tab 1508, an "analysis" tab 1510, and "My Home" tab 1512. An "analysis" tab 1510 is selected and an analysis panel 1520 is displayed that includes a visualization associated with a set of search results is. The "analysis" tab panel 1520 includes user-selectable control panel 1524 that has multiple filters for adjusting the search results, for example using data limiters or by negating particular companies or classifications, thereby reducing the document space of the search results. The "analysis" tab panel 1520 further includes a landscape or visualization 1522 based on the search results. In this particular example, a document landscape is shown. Further, the "analysis" tab panel 1520 includes user-selectable indicators, such as the menu 1526, which may be used to switch between visualization. For example, the user may select "industry statistics" 1530, a "world map" 1532, "legal trends" 1534, or other options to alter visualizations based on the search results and to view dimensions related to the search results, which can be derived based on a globally unique identifier.

In a particular embodiment, in a patent database, the patent number may represent a globally unique identifier. Additionally, each inventor and each assignee may be assigned globally unique identifiers in order to relate inventors across multiple assignees and to derive relationships between various entities based on a found set of patents.

In a particular example, the graphical user interface 1500 includes user selectable elements, such as the tabs 1506, 1508, 1510, and 1512, the "apply filter" and "save filter" buttons, the menu 1526, the text box 1504, and other user selectable elements. Further, the graphical user interface 1500 includes data related to a set of search results, including data dimensions that may be derived from data retrieved using globally unique identifiers, relationships between globally unique identifiers, and associated meta-data. In particular, the industry statistics menu item 1530 can be used to access statistical data related to industries identified in the set of search results, which statistical data may be associated with the search results based on embedded meta-data or based on relationships between globally unique identifiers associated with information items within the set of search results. Thus, the particular menu options and the associated information may be dynamically assembled and correlated with the search results, for multi-dimensional data retrieval.

Figure 16:
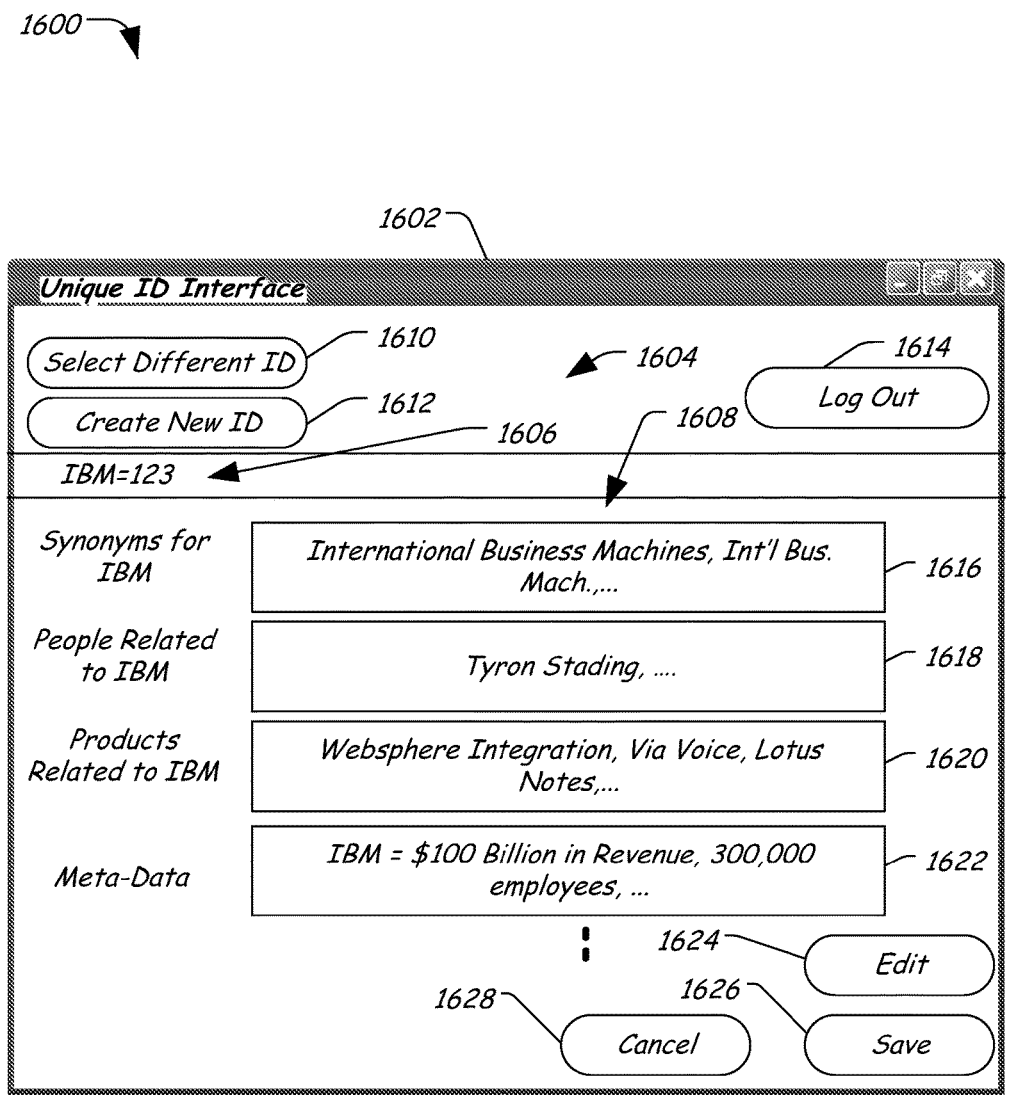
FIG. 16 is a diagram of a particular illustrative embodiment of a graphical user interface including a plurality of user selectable indicators accessible to a user to modify mappings between text strings and globally unique identifiers stored in the unique identifier repository.

FIG. 16 is a diagram of a particular illustrative embodiment of a graphical user interface 1600 including a plurality of user selectable indicators accessible to a user to modify mappings between text strings and globally unique identifiers stored in the unique identifier repository. In a particular embodiment, the graphical user interface 1600 may be accessible only to authorized users via user name and password authentication. The graphical user interface 1600 includes a window 1602 having a navigation portion 1604, a record identification portion 1606, and an editing portion 1608. The navigation portion 1604 includes a plurality of user-selectable indicators, including a select different identifier button 1610 to select a different globally unique identifier for editing. Further, the navigation portion 1604 includes a select create new identifier button 1612 that can used to create a new globally unique identifier for a piece of information. The navigation portion 1604 also includes a logout button 1614 that allows a user to exit a session.

The editing portion 1608 includes user-selectable elements 1616, 1618, and 1620 to allow a user to edit associations and related information, such as synonyms for the particular company, people related to the particular company, products related to the particular company, and so on. Further, the editing portion 1608 includes at least one user-selectable element 1622 to allow a user to edit meta-data associated with the selected globally unique identifier shown in the record identification portion 1606. The editing portion 1608 further includes additional user-selectable indicators, including an edit button 1624 to edit information contained in the record, a save button 1626 to save changes to the information, and a cancel button 1628 to exit an edit mode without saving changes. In a particular example, the graphical user interface 1602 can be used with a collection of Internet pages that will allow for public access and editing of the records, such as a WIKI-type content source.

In general, the graphical user interface 1600 may be accessed by users to updated and modify associated relationships and meta-data associated with a particular globally unique identifier. In a particular example, the graphical user interface 1600 may be accessible to the general public, similar to a WIKI-type web site to allow users to supplement available information related to the globally unique identifier. In another embodiment, the graphical user interface 1600 may be accessible only to authorized users.

In conjunction with the systems, methods and interfaces described above with respect to FIGS. 1-16, a system is disclosed to create, store and share globally unique identifiers that can be used to retrieve and join (correlate) information retrieved from multiple data sources. In a particular example, the system operates as a central clearinghouse for globally unique identifiers so that the globally unique identifier can be registered to guarantee uniqueness across a known space. Further, the globally unique identifier can have large number of bits, such as 128-bits or more to statistically ensure uniqueness over a large domain of information. By using a globally unique identifier, search results can be rendered more accurate across multiple data sources and the resulting information can be more readily joined to allow for multi-dimensional analysis and presentation of such search results.

Although the present invention has been described with reference to preferred embodiments, workers skilled in the art will recognize that changes may be made in form and detail without departing from the spirit and scope of the invention.

What is claimed is:

1. A method comprising:
receiving a text string from a source device at a centralized repository, the centralized repository having a unique identifier repository including a plurality of globally unique identifiers, each of the plurality of globally unique identifiers comprising a data value that uniquely represents one of a name of a company and a name of a specific person;
automatically applying statistical analysis to identify a globally unique identifier corresponding to at least a portion of the text string from a plurality of globally unique identifiers in the unique identifier repository;
automatically determining distributed correlation data corresponding to one or more categories extracted from the text string, the distributed correlation data including a mapping of the one or more categories to a plurality of centralized categories of the centralized repository;
storing the distributed correlation data and the globally unique identifier at a memory of the centralized repository;
searching multiple data sources based on the text string and the globally unique identifier;
receiving, at the centralized repository, search results from the multiple data sources;
correlating, at the centralized repository, the search results using the distributed correlation data to produce a set of correlated search results; and
providing an interface including data related to the correlated set of search results to the source device.

2. The method of claim 1, wherein the globally unique identifier comprises a character string that is uniquely related to a proper noun.

3. The method of claim 1, further comprising extracting the text string from a document or record received from the source device.

4. The method of claim 3, wherein storing the distributed correlation data and the globally unique identifier comprises:
   associating the globally unique identifier with the distributed correlation data;
   storing the distributed correlation data and the globally unique identifier in the memory of the centralized repository; and
   providing at least one of the globally unique identifier and the distributed correlation data to the source device.

5. The method of claim 1, wherein storing the received data comprises associating the globally unique identifier with at least one data item at the source device.

6. The method of claim 1, further comprising searching multiple data sources using a query that is related to the globally unique identifier.

7. The method of claim 1, further comprising joining results from multiple data sources using the globally unique identifier to correlate the results.

* * * * *